(12) United States Patent
Liu et al.

(10) Patent No.: US 12,720,391 B2
(45) Date of Patent: Aug. 25, 2026

(54) COMMUNICATION METHOD, APPARATUS, AND SYSTEM

(71) Applicant: HUAWEI TECHNOLOGIES CO., LTD., Shenzhen (CN)

(72) Inventors: Jing Liu, Shenzhen (CN); Yuanping Zhu, Shanghai (CN); Longhua Guo, Shanghai (CN); Li Hu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 293 days.

(21) Appl. No.: 18/505,495

(22) Filed: Nov. 9, 2023

(65) Prior Publication Data

US 2024/0073762 A1 Feb. 29, 2024

Related U.S. Application Data

(63) Continuation of application No. PCT/CN2022/090572, filed on Apr. 29, 2022.

(30) Foreign Application Priority Data

May 10, 2021 (CN) ........................ 202110507851.5

(51) Int. Cl.
*H04W 4/00* (2018.01)
*H04W 12/0433* (2021.01)
*H04W 36/08* (2009.01)

(52) U.S. Cl.
CPC ....... *H04W 36/08* (2013.01); *H04W 12/0433* (2021.01)

(58) Field of Classification Search
CPC ...... H04L 9/08; H04W 12/04; H04W 12/106; H04W 12/0433; H04W 36/08;
(Continued)

(56) References Cited

U.S. PATENT DOCUMENTS

2011/0185397 A1* 7/2011 Escott ................ H04W 12/069
726/3
2020/0221329 A1 7/2020 Kim
(Continued)

FOREIGN PATENT DOCUMENTS

CN 112087754 12/2020

OTHER PUBLICATIONS

Qualcomm, "CB#34 IAB_MigrationProcedureDetails," 3GPP TSG-RAN WG3 #111-e, R3-211199, Jan. 25-Feb. 4, 2021, 57 pages.
(Continued)

*Primary Examiner* — Shantell L Heiber
(74) *Attorney, Agent, or Firm* — Fish & Richardson P.C.

(57) ABSTRACT

This application provides a communication method, apparatus, and system. The method includes: A first node communicates with a first donor node by using a first key, where the first key includes a key used for communication over an air interface and/or a key 1 used for communication over an F1 interface. After the first node receives first information from the first donor node, the first node maintains the first key and a second key in response to the first information, where the second key includes a key used for communication over an air interface between the first node and a second donor node and/or a key 2 used for communication over the F1 interface.

20 Claims, 13 Drawing Sheets

(58) Field of Classification Search
CPC ........... H04W 12/0431; H04W 12/041; H04W 36/0038; H04W 92/20
See application file for complete search history.

(56) References Cited

U.S. PATENT DOCUMENTS

2020/0396611 A1* 12/2020 Rajadurai ........... H04L 63/0869
2022/0132381 A1* 4/2022 Novlan ................. H04W 76/20
2023/0098848 A1* 3/2023 Ishii .................. H04W 36/0033
370/216
2024/0064601 A1* 2/2024 Chen ................... H04W 36/362

OTHER PUBLICATIONS

Extended European Search Report in European Appln No. 22806567.8, dated Sep. 30, 2024, 7 pages.
International Search Report and Written Opinion in International Appln. No. PCT/CN2022/090572, mailed on Jul. 27, 2022, 23 pages (with English translation).
ZTE, "Discussion on reduction of service interruption, intra-donor CHO and RLF," 3GPP TSG-RAN WG3 #112-e, R3-212038, Online, May 17-27, 2021, 11 pages.
3GPP TR 33.824 V0.8.0, 3rd Generation Partnership Project; Technical Specification Group Services and System Aspects; Study on Security for NR Integrated Access and Backhaul; (Release 17), Jan. 2021, 20 pages.
EP Communication Pursuant to Article 94(3) EPC in European Appln. No. 22806567.8, mailed on May 21, 2026, 9 pages.

* cited by examiner

COMMUNICATION METHOD, APPARATUS, AND SYSTEM

CROSS-REFERENCE TO RELATED APPLICATIONS

This application is a continuation of International Application No. PCT/CN2022/090572, filed on Apr. 29, 2022, which claims priority to Chinese Patent Application No. 202110507851.5, filed on May 10, 2021. The disclosures of the aforementioned applications are hereby incorporated by reference in their entireties.

TECHNICAL FIELD

This application relates to the field of communication technologies, and in particular, to a communication method, apparatus, and system.

BACKGROUND

In one aspect, because high-frequency carriers have abundant frequency resources, using high-frequency small cells for networking becomes increasingly popular in a hotspot area to meet an ultra-high capacity requirement of future communication. However, the high-frequency carriers are severely attenuated if blocked, and have small coverage. Therefore, a large quantity of densely deployed high-frequency small cells are required. Correspondingly, providing backhaul for these densely deployed high-frequency small cells by using optical fibers has high costs and is difficult to implement. Therefore, a more economical and convenient backhaul solution is required. In another aspect, when network coverage is provided in some remote areas, deploying optical fibers is difficult and costly. Therefore, a flexible and convenient backhaul solution also needs to be designed. A wireless backhaul device provides an idea for resolving the foregoing problems. Both an access link (access link, AL) and a backhaul link (backhaul link, BL) of the wireless backhaul device use a wireless transmission solution, to reduce deployment of the optical fibers. The wireless backhaul device may be a relay node (Relay Node, RN), for example, an integrated access backhaul (Integrated Access Backhaul, IAB) node.

The wireless backhaul device may backhaul a data packet from a terminal device to a donor node through a wireless backhaul link, or may send a data packet from the donor node to the terminal device through a wireless access link. A communication network formed by one or more wireless backhaul devices may be referred to as a wireless backhaul network or a relay network.

Generally, one relay node is connected to only one donor node. However, with evolution of the relay network, a communication scenario in which one relay node is connected to a plurality of donor nodes emerges. Currently, there is no secure transmission solution for this new communication scenario. As a result, security risks exist in data transmission.

SUMMARY

This application provides a communication method, apparatus, and system, to improve reliability of the communication system.

According to a first aspect, a communication method is provided, including: A first node communicates with a first donor node by using a first key, where the first key includes a key used for communication over an air interface and/or a key 1 used for communication over an F1 interface; the first node receives first information from the first donor node; and the first node maintains the first key and a second key in response to the first information, where the second key includes a key used for communication over an air interface between the first node and a second donor node and/or a key 2 used for communication over the F1 interface.

In the solution provided in the first aspect, both the first key and the second key are maintained, so that the first donor node and the first node may still derive a same key (for example, a per-shared key (per-shared key, PSK)) used for communication over an F1 interface between the first donor node and the first node. Therefore, a security tunnel between the first node and the first donor node can be maintained, and further, interruption or security risks during communication of the first node can be reduced.

In a possible design of the first aspect, the key 1 used for communication over the F1 interface is derived based on the key used for communication over the air interface, and the key 2 used for communication over the F1 interface is derived based on the key used for communication over the air interface between the first node and the second donor node.

In a possible design of the first aspect, the key used for communication over the air interface includes a root key.

In a possible design of the first aspect, the key 1 used for communication over the F1 interface includes a first PSK, and the key 2 used for communication over the F1 interface includes a second PSK.

In a possible design of the first aspect, the first information is carried in a message that indicates the first node to hand over to the second donor node.

In a possible design of the first aspect, the first donor node is a source donor node, and the second donor node is a target donor node.

In a possible design of the first aspect, the first information is carried in a message used to configure the second donor node as a secondary donor node of the first node.

In a possible design of the first aspect, the first donor node is a primary donor node, and the second donor node is a secondary donor node.

In a possible design of the first aspect, the first node includes a mobile terminal (mobile terminal, MT) and a distributed unit (distributed unit, DU), and the MT sends, to the DU based on indication information from the DU, the first donor node, or the second donor node, the key 2 used for communication over the F1 interface.

According to this design, beneficial effects include, for example: The MT may be flexibly indicated to send, to the DU, the key 2 used for communication over the F1 interface, so that the DU and the first donor node may still have a same key (for example, a PSK) used for communication over the F1 interface between the first donor node and the first node. Therefore, a security tunnel between the DU and the first donor node can be maintained, and further, interruption or security risks during communication of the first node can be reduced.

In a possible design of the first aspect, the first node includes a mobile terminal MT and a distributed unit DU, and the method includes: The DU sends, to the MT based on indication information from the first donor node or the second donor node, the key used for communication over the air interface.

According to this design, beneficial effects include, for example: The DU may be flexibly indicated to send, to the MT, the key used for communication over the air interface, so that the MT may derive, based on the key used for communication over the air interface, the key 2 used for communication over the F1 interface, and send, to the DU, the key 2 used for communication over the F1 interface. Therefore, the DU and the first donor node may still have a same key (for example, a PSK) used for communication over the F1 interface between the first donor node and the first node, so that a security tunnel between the DU and the first donor node can be maintained, and further, interruption or security risks during communication of the first node can be reduced.

In a possible design of the first aspect, the indication information includes identification information, an internet protocol (internet protocol, IP) address, or a backhaul adaptation protocol (backhaul adaptation protocol, BAP) address of the first donor node.

In a possible design of the first aspect, the indication information specifically includes identification information of a CU of the first donor node, an IP address of the CU of the first donor node, or a BAP address of a DU of the first donor node.

In a possible design of the first aspect, the MT stores a correspondence between the key 2 used for communication over the F1 interface and the first donor node. That the MT sends, to the DU based on indication information from the DU, the first donor node, or the second donor node, the key 2 used for communication over the F1 interface includes: The MT sends, to the DU based on the indication information and the correspondence, the key 2 used for communication over the F1 interface.

In a possible design of the first aspect, the indication information includes IP address information of the first node.

In a possible design of the first aspect, the MT stores a correspondence between the key 2 used for communication over the F1 interface and the IP address information of the first node. That the MT sends, to the DU based on indication information from the DU, the first donor node, or the second donor node, the key 2 used for communication over the F1 interface includes: The MT sends, to the DU based on the indication information and the correspondence, the key 2 used for communication over the F1 interface.

In a possible design of the first aspect, the indication information indicates that the DU of the first node is not handed over or not moved, or the F1 interface of the first node is not changed. According to this design, beneficial effects include, for example: The first node may more accurately determine whether to use the first key or the second key for communication with the first donor node.

In a possible design of the first aspect, the DU stores a correspondence between the key 2 used for communication over the F1 interface and the first donor node. That the DU sends, to the MT based on indication information from the first donor node or the second donor node, the key used for communication over the air interface includes: The DU sends, to the MT based on the indication information and the correspondence, the key used for communication over the air interface.

According to a second aspect, another communication method is provided. A first node communicates with a first donor node by using a first key, where the first key includes a key used for communication over an air interface and/or a key used for communication over an F1 interface. The first node receives a second key from the first donor node, where the second key includes a key used for communication over an air interface with a second donor node.

In this solution, the first node obtains the second key, so that the first node and the second donor node may derive a same key (for example, a PSK) used for communication over an F1 interface between the second donor node and the first node. Therefore, an IPsec security tunnel can be established between the first node and the second donor node, and further, interruption or security risks during communication of the first node can be reduced.

In a possible design of the second aspect, that the first node receives a second key from the first donor node includes: The first node receives an F1 interface application protocol (F1 application protocol, F1AP) message from the first donor node, where the F1AP message includes the second key. According to this design, beneficial effects include, for example: Security of the F1AP message carrying the second key may be ensured through a security tunnel between the first node and the first donor node, thereby ensuring secure transmission of the second key.

In a possible design of the second aspect, the first node includes a DU part. That the first node receives a second key from the first donor node includes: A DU of the first node receives the second key from the first donor node.

In a possible design of the second aspect, the DU of the first node derives, based on the second key, a third key used for communication over the F1 interface.

In a possible design of the second aspect, the first node further includes an MT part. The DU of the first node sends the second key to an MT of the first node. The DU of the first node receives the third key from the MT of the first node that is derived based on the second key and that is used for communication over the F1 interface.

In a possible design of the second aspect, that the first node receives a second key from the first donor node includes: The first node receives a radio resource control (radio resource control, RRC) message from the first donor node, where the RRC message includes the second key.

In a possible design of the second aspect, the first node includes a mobile terminal MT part. That the first node receives a second key from the first donor node includes: An MT of the first node receives the second key from the first donor node.

In a possible design of the second aspect, the MT of the first node derives, based on the second key, a third key used for communication over the F1 interface.

In a possible design of the second aspect, the first node includes a DU part. The MT of the first node obtains indication information. The MT of the first node sends, to a DU of the first node based on the indication information, the third key used for communication over the F1 interface. According to this design, beneficial effects include, for example: The MT may be flexibly indicated to send, to the DU, the third key used for communication over the F1 interface, so that the DU and the second donor node may still have a same key (for example, a PSK) used for communication over an F1 interface between the second donor node and the first node. Therefore, a security tunnel between the DU and the second donor node can be successfully established, and further, interruption or security risks during communication of the first node can be reduced.

In a possible design of the second aspect, the first node receives first information from the first donor node. The first node maintains, in response to the first information, the first key and the second key, or maintains the first key and the third key. According to this design, beneficial effects include, for example: The first key is overwritten by maintaining the first key and the second key instead of using the second key, or the first key is overwritten by maintaining the first key and the third key instead of using the third key, so that the second donor node and the first node may still have a same key (for example, a PSK) used for communication over the F1 interface between the second donor node and the first node. Therefore, a security tunnel between the first node and the second donor node can be successfully established, and further, interruption or security risks during communication of the first node can be reduced.

In a possible design of the second aspect, the indication information is from the first donor node, the second donor node, or the DU.

In a possible design of the second aspect, the indication information includes identification information of the first donor node or identification information of the second donor node.

According to a third aspect, this application provides a communication apparatus, including at least one processor and an interface, where the interface is configured to input and/or output a signal. For example, the interface is configured to: receive a signal from another communication apparatus other than the communication apparatus, and transmit the signal to the processor; and/or the interface is configured to: send a signal from the processor to the another communication apparatus other than the communication apparatus. The processor is configured to enable the communication apparatus to perform the foregoing methods. For example, the processor implements any method in the first aspect or the second aspect by using a logic circuit and/or executing program instructions.

Optionally, the apparatus may be a chip or an integrated circuit in a node in the first aspect or the second aspect.

Optionally, the communication apparatus may further include at least one memory, and the memory stores program instructions. The processor is coupled to the at least one memory, and is configured to execute a program, to implement the foregoing method designs.

According to a fourth aspect, this application provides a communication apparatus. The apparatus has a component (component), a module (module), a unit (unit), or a means (means) for implementing any one of the method in the first aspect or the method in the second aspect, and the method in any one of the designs thereof. The apparatus may be implemented by using hardware, software, firmware, or any combination thereof. For example, the apparatus may be implemented by executing corresponding software by hardware. The hardware or software includes one or more corresponding units (modules) configured to implement the foregoing method designs, for example, including a transceiver unit and a processing unit.

According to a fifth aspect, this application provides a computer-readable storage medium. The computer-readable storage medium stores program instructions, and when the program instructions are run by a processor, any one of the method in the first aspect or the method in the second aspect, and the method in any one of the designs thereof is implemented.

According to a sixth aspect, this application provides a computer program product. The computer program product includes program instructions, and when the program instructions are executed by a processor, any one of method in the first aspect or the method in the second aspect, and the method in any one of the designs thereof is implemented.

According to a seventh aspect, this application further provides a chip. The chip is configured to implement any one of the method in the first aspect, the method in the second aspect, and any one of the designs of the method in the first aspect, the method in the second aspect.

BRIEF DESCRIPTION OF DRAWINGS

The following describes the solutions provided in this application in detail with reference to the accompanying drawings. Features or content identified by dashed lines in the accompanying drawings may be understood as optional operations or optional structures in embodiments of this application.

DESCRIPTION OF EMBODIMENTS

Figure 1:
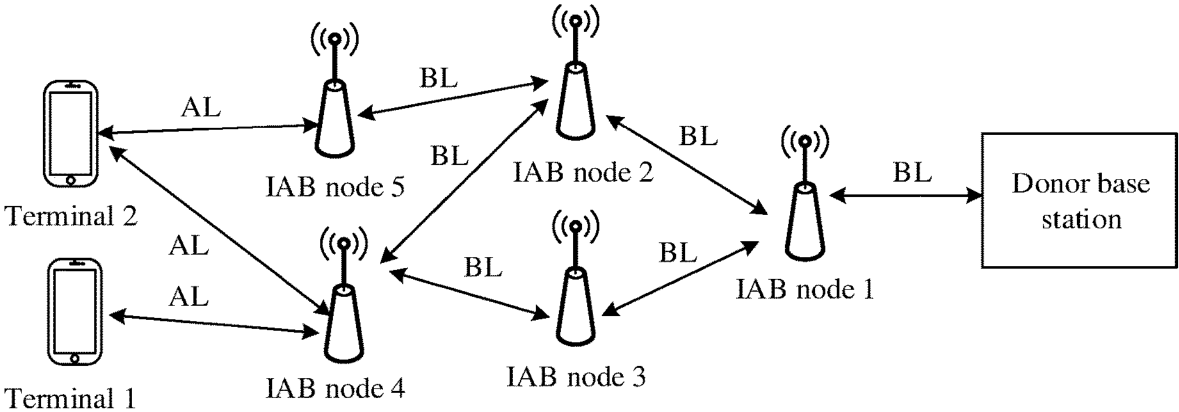
FIG. 1 is a schematic diagram of an IAB network communication system.

FIG. 1 is a schematic diagram of an TAB network communication system according to this application. The communication system includes a terminal, an TAB node, and a donor base station. In this application, an "TAB network" is merely an example, and may be replaced with a "wireless backhaul network" or a "relay network". The "TAB node" is merely an example, and may be replaced with a "wireless backhaul device" or a "relay node".

The donor base station (donor base station) may serve as a donor node of the TAB node. In this application, the donor base station may include but is not limited to a next-generation base station (next-generation NodeB, gNB), an evolved NodeB (evolved Node B, eNB), a radio network controller (radio network controller, RNC), a NodeB (NodeB, NB), a base station controller (base station controller, BSC), a base transceiver station (base transceiver station, BTS), a home base station (home evolved Node B or home NodeB), a transmission point (transmission and reception point or transmission point), and a roadside unit (road side unit, RSU), a baseband unit (baseband unit, BBU), a remote radio unit (Remote Radio Unit, RRU), an active antenna unit (active antenna unit, AAU), and one or a group of antenna panels that have a function of a base station, a node having a base station function in a subsequent evolved system, or the like. The donor base station may be an entity, or may include a central unit (central unit, CU) entity and at least one distributed unit (distributed unit, DU) entity. An interface between a CU and a DU may be referred to as an F1 interface. Two ends of the F1 interface are respectively the CU and the DU. A peer end of an F1 interface of the CU is the DU, and a peer end of an F1 interface of the DU is the CU. The F1 interface may further include a control plane F1 interface (F1-C) and a user plane F1 interface (F1-U). In this application, a CU of the donor base station may be referred to as a donor CU for short, and a DU of the donor base station may be referred to as a donor DU for short.

In this application, a terminal is also sometimes referred to as user equipment (user equipment, UE), a mobile station, a terminal device, or the like. The terminal may be widely used in various scenarios, for example, device-to-device (device-to-device, D2D), vehicle to everything (vehicle to everything, V2X) communication, machine-type communication (machine-type communication, MTC), an internet of things (internet of things, IoT), virtual reality, augmented reality, industrial control, self-driving, telemedicine, a smart grid, smart furniture, smart office, a smart wearable, smart transportation, and a smart city. The terminal may be a mobile phone, a tablet computer, a computer with a wireless transceiver function, a wearable device, a vehicle, an uncrewed aerial vehicle, a helicopter, an airplane, a ship, a robot, a robotic arm, a smart home device, or the like. The terminal may include but is not limited to user equipment UE, a mobile station, a mobile device, a terminal device, a user agent, a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device (for example, a smart watch, a smart band, and smart glasses), smart furniture or home appliances, a vehicle device in vehicle to everything (vehicle to everything, V2X), a terminal device with a relay function, customer premises equipment (customer premises equipment, CPE), an IAB node (which specifically is an MT of the IAB node or an IAB node that functions as a terminal), or the like. A specific name and an implementation form of the terminal are not limited in this application.

In this application, the IAB node may include at least one mobile terminal (mobile terminal, MT) and at least one distributed unit DU (distributed unit, DU). The IAB node may be an entity. For example, the IAB node includes at least one MT function and at least one DU function. The IAB node may also include a plurality of entities. For example, the IAB node includes at least one MT entity and at least one DU entity. The MT entity and the DU entity may communicate with each other, for example, communicate with each other through a network cable. When the IAB node communicates with a parent node of the IAB node (the parent node may be the donor base station or another IAB node), the IAB node may be used as a terminal. For example, the IAB node may be used in various application scenarios of the foregoing terminal, that is, a terminal role of the IAB node. In this case, the MT function or the MT entity provides the terminal role for the IAB node. When the IAB node communicates with a child node of the IAB node (the child node may be another IAB node or the terminal), the IAB node may be used as a network device, that is, a network device role of the IAB node. In this case, the DU function or the DU entity provides the network device role for the IAB node. In this application, the MT of the IAB node may be referred to as an IAB-MT for short, and the DU of the IAB node may be referred to as an IAB-DU for short. The IAB node may access the donor base station, or may be connected to the donor base station through another IAB node.

The IAB network supports multi-hop networking and multi-connection networking to ensure service transmission reliability. The IAB node considers an IAB node that provides a backhaul service for the IAB node as a parent node, and correspondingly, the IAB node may be considered as a child node of the parent node of the IAB node. The terminal may also consider an IAB node accessed by the terminal as a parent node, and correspondingly, the IAB node may also consider the terminal that accesses the IAB node as a child node. The IAB node may consider a donor base station accessed by the IAB node as a parent node, and correspondingly, the donor base station may also consider the IAB node that accesses the donor base station as a child node. As shown in FIG. 1, a parent node of an IAB node 1 includes a donor base station. The IAB node 1 is a parent node of an IAB node 2 or an IAB node 3. A parent node of a terminal 1 includes an IAB node 4. A child node of the IAB node 4 includes the terminal 1 or a terminal 2. An IAB node directly accessed by the terminal may be referred to as an access IAB node. The IAB node 4 in FIG. 1 is an access IAB node of the terminal 1 and the terminal 2. An IAB node 5 is an access IAB node of the terminal 2. A node on an uplink transmission path from an IAB node to the donor base station may be referred to as an upstream node (upstream node) of the IAB node. The upstream node may include a parent node, a parent node (or referred to as a grandfather node) of the parent node, and the like. For example, the IAB node 1 and the IAB node 2 in FIG. 1 may be referred to as upstream nodes of the IAB node 5. Anode on a downlink transmission path from an IAB node to a terminal may be referred to as a downstream node (downstream node) or a descendant node (descendant node) of the IAB node. The downstream node or the descendant node may include a child node, a child node (or referred to as a grandchild node) of the child node, a terminal, or the like. For example, the terminal 1, the terminal 2, the IAB node 2, the IAB node 3, the IAB node 4, or the IAB node 5 in FIG. 1 may be referred to as downstream nodes or descendant nodes of the IAB node 1. For another example, the IAB node 4 and the IAB node 5 in FIG. 1 may be referred to as downstream nodes or descendant nodes of the IAB node 2. The terminal 1 in FIG. 1 may be referred to as a downstream node or a descendant node of the IAB node 4. Each IAB node needs to maintain a parent node-oriented backhaul link (backhaul link, BL). If a child node of the IAB node is a terminal, the IAB node further needs to maintain an access link (access link, AL) between the IAB node and the terminal. As shown in FIG. 1, a link between the IAB node 4 and the terminal 1 or the terminal 2 includes an AL, and a link between the IAB node 4 and the IAB node 2 or the IAB node 3 includes a BL.

Figure 2:
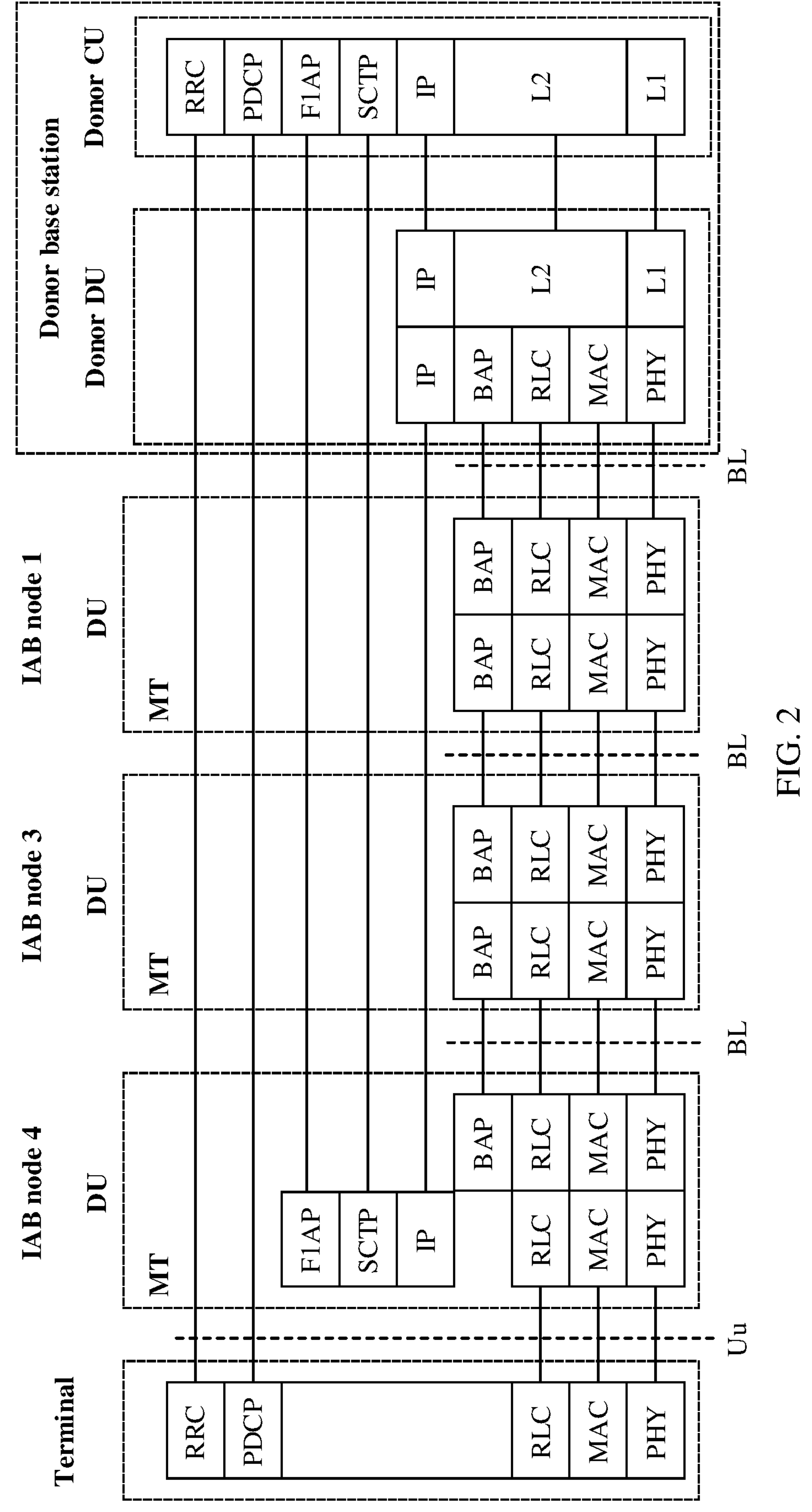
FIG. 2 is a schematic diagram of a control plane protocol stack in an IAB network.
Figure 3:
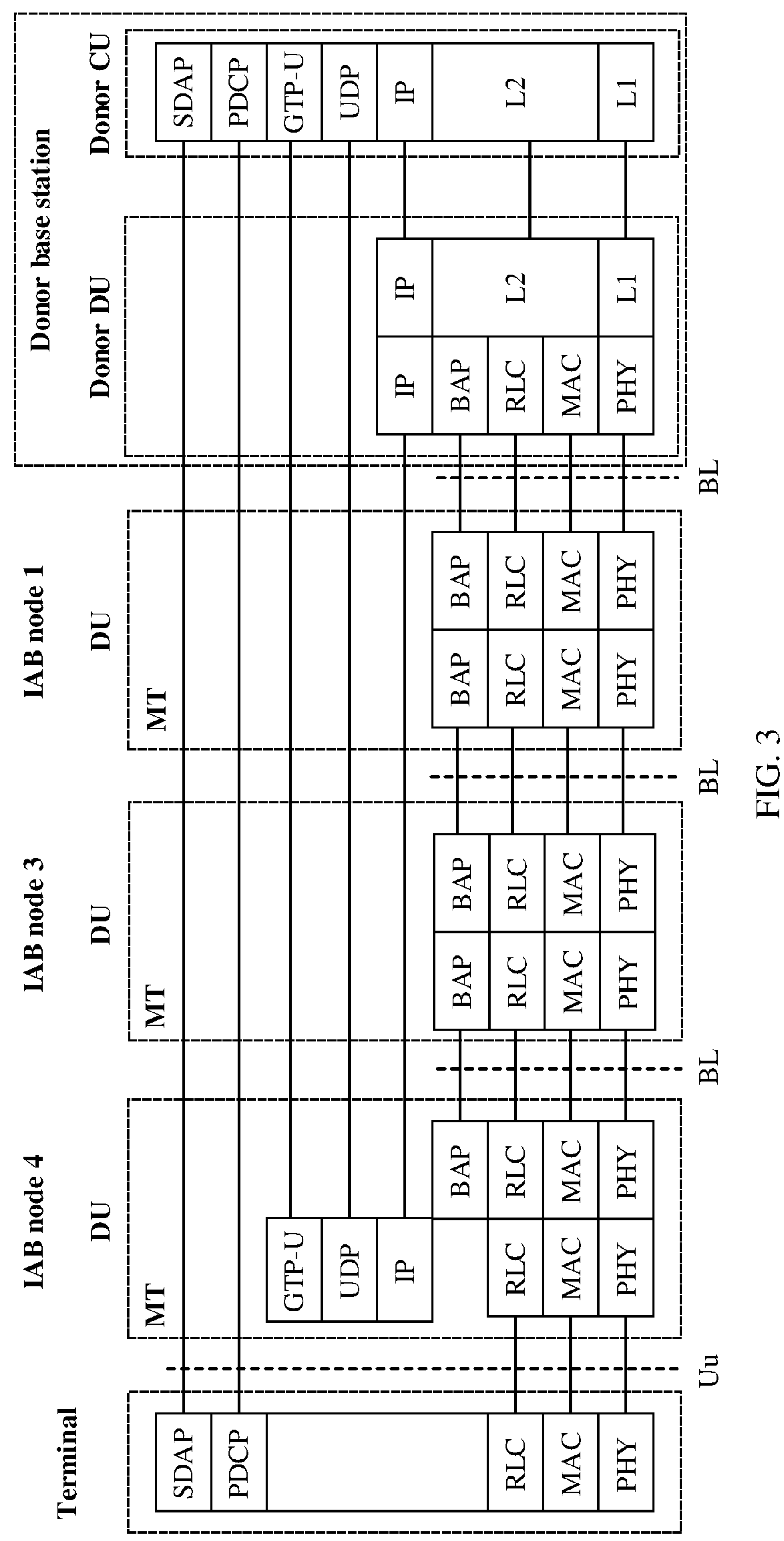
FIG. 3 is a schematic diagram of a user plane protocol stack in an IAB network.

FIG. 2 and FIG. 3 are respectively a schematic diagram of a control plane protocol stack and a schematic diagram of a user plane protocol stack in an IAB network according to embodiments of this application. Donor base stations in FIG. 2 and FIG. 3 may include functions of a donor CU and a donor DU (in this case, a donor base station is one entity), or may include a donor CU entity and a donor DU entity (in this case, a donor base station is divided into two entities). As shown in FIG. 2 or FIG. 3, peer protocol layers between a donor DU and a donor CU include an IP layer, a layer 2 (layer 2, L2), and a layer 1 (layer 1, L1). L1 and L2 may refer to protocol stack layers in a wired transmission (for example, optical fiber transmission) network. For example, L1 may be a physical layer, and L2 may be a data link layer. A backhaul link (BL) is established between an IAB node 4 and an IAB node 3, between the IAB node 3 and an IAB node 1, and between the IAB node 1 and the donor DU. Peer protocol stacks at two ends of a BL may include a backhaul adaptation protocol (backhaul adaptation protocol, BAP) layer, a radio link control (radio link control, RLC), a media access control (medium access control, MAC) layer, and a physical (physical, PHY) layer.

As shown in FIG. 2, an interface exists between a terminal and the donor base station, and sometimes the interface is an air interface. For example, the interface may be referred to as a Uu interface. One end of the Uu interface is located at the terminal, and the other end of the Uu interface is located at the donor base station. Peer control plane protocol stacks at two ends of the Uu interface include a radio resource control (radio resource control, RRC) layer, a packet data convergence protocol (packet data convergence protocol, PDCP) layer, the RLC layer, the MAC layer, and the PHY layer. A protocol layer included in a control plane protocol stack of the Uu interface may also be referred to as an access stratum (access stratum, AS) layer of a control plane. If the donor base station includes a donor CU entity and a donor DU entity, a control plane protocol stack of the Uu interface at a donor base station end may be separately located in a donor DU and a donor CU. For example, the PHY layer, the MAC layer, and the RLC layer are located in the donor DU, and the RRC layer and the PDCP layer are located in the donor CU.

An interface exists between a DU of an IAB node (that is, the IAB node 4 in FIG. 2) accessed by the terminal and the donor base station. For example, the interface may be referred to as an F1 interface. One end of the F1 interface is located at the IAB node 4, and the other end is located at the donor base station. A peer end of an F1 interface of the donor base station (for example, the donor CU) is the IAB node (which may specifically be the DU of the IAB node). A peer end of an F1 interface of the IAB node (which may specifically be the DU of the IAB node) is the donor base station (which may specifically be the donor CU). Peer control plane protocol stacks at two ends of the F1 interface include an F1 application protocol (F1 application protocol, F1 AP) layer, a stream control transmission protocol (stream control transmission protocol, SCTP) layer, and an IP layer. The donor base station may include a donor CU entity and a donor DU entity. A control plane protocol stack of the F1 interface at the donor base station end may be located in the donor CU. For example, the donor CU includes the F1AP layer, the SCTP layer, and the IP layer. Alternatively, the control plane protocol stack of the F1 interface at the donor base station end may be separately located at the donor CU and the donor DU. For example, the donor CU includes the F1AP layer and the SCTP layer, and the donor DU includes the IP layer. As shown in FIG. 3, peer user plane protocol stacks at two ends of a Uu interface between the terminal and the donor base station include a service data adaptation protocol (service data adaptation protocol, SDAP) layer, the PDCP layer, the RLC layer, the MAC layer, and the PHY layer. A protocol layer included in a user plane protocol stack of the Uu interface may also be referred to as an access stratum (AS) layer of a user plane. If the donor base station includes a donor CU entity and a donor DU entity, a user plane protocol stack of the Uu interface at the donor base station end may be separately located in a donor DU and a donor CU. For example, the PHY layer, the MAC layer, and the RLC layer are located in the donor DU, and the SDAP layer and the PDCP layer are located in the donor CU.

Peer user plane protocol layers at two ends of an F1 interface between a DU of the IAB node 4 and the donor base station include a general packet radio service user plane tunneling protocol (general packet radio service tunneling protocol for the user plane, GTP-U) layer, a user datagram protocol (user datagram protocol, UDP) layer, and the IP layer. The donor base station may include a donor CU entity and a donor DU entity. A user plane protocol stack of the F1 interface at the donor base station end may be located in the donor CU. For example, the donor CU includes the GTP-U layer, the UDP layer, and the IP layer. Alternatively, the user plane protocol stack of the F1 interface at the donor base station end may be separately located at the donor CU and the donor DU. For example, the donor CU includes the GTP-U layer and the UDP layer, and the donor DU includes the IP layer.

In addition, in FIG. 2 and FIG. 3, when the terminal accesses the donor DU, an interface between the donor DU and the donor CU may also include an F1 interface. Peer control plane protocol stacks at two ends of the F1 interface include the F1AP layer, the SCTP layer, and the IP layer. Peer user plane protocol stacks at the two ends of the F1 interface include the GTP-U layer, the UDP layer, and the IP layer. When the terminal accesses the IAB node 1 or the IAB node 3, an F1 interface may also be included between the IAB node 1 or the IAB node 3 and the donor base station. For description of the F1 interface, refer to the description of the F1 interface between the DU of the IAB node 4 and the donor base station.

When the terminal refers to an MT function or an MT entity of an IAB node, or the terminal refers to an IAB node serving as a terminal, a protocol stack of the terminal shown in FIG. 2 or FIG. 3 is a protocol stack of the MT function or the MT entity of the IAB node, or a protocol stack of the IAB node serving as a terminal.

When accessing an IAB network, the IAB node may serve as a terminal. In this case, an MT of the IAB node has a protocol stack of the terminal. A protocol stack of an air interface (Uu interface) exists between the IAB node and the donor base station. Protocol stacks of the terminal shown in FIG. 2 and FIG. 3 include the RRC layer or the SDAP layer, the PDCP layer, the RLC layer, the MAC layer, and the PHY layer. On a control plane, an RRC message of the IAB node is encapsulated by a parent node of the IAB node in an F1AP message for transmission. On a user plane, a data packet of the IAB node is encapsulated in a PDCP protocol data unit (protocol data unit, PDU) and sent to the parent node of the IAB node. The parent node of the IAB node encapsulates the received PDCP PDU into a GTP-U tunnel on an F1 interface between the parent node of the IAB node and a donor CU for transmission. In addition, after the IAB node accesses the IAB network, the IAB node may still serve as a common terminal. For example, the IAB node may transmit a data packet of the IAB node to the donor base station, and the data packet may be, for example, an operation, administration, and maintenance (operation, administration, OAM) network element data packet and a measurement report.

It should be noted that one IAB node may have one or more roles in the IAB network. For example, the IAB node may serve as both a terminal role and an access IAB node role (a protocol stack of the IAB node 4 in FIG. 2 and FIG.

3) or an intermediate IAB node role (a protocol stack of the IAB node 1 or the IAB node 3 in FIG. 2 and FIG. 3). The IAB node may use protocol stacks corresponding to different roles for different roles. When the IAB node has a plurality of roles in the IAB network, the IAB node may have a plurality of protocol stacks at the same time. Protocol stacks may share some same protocol layers, for example, a same RLC layer, a same MAC layer, and a same PHY layer.

Figures 4, 5:
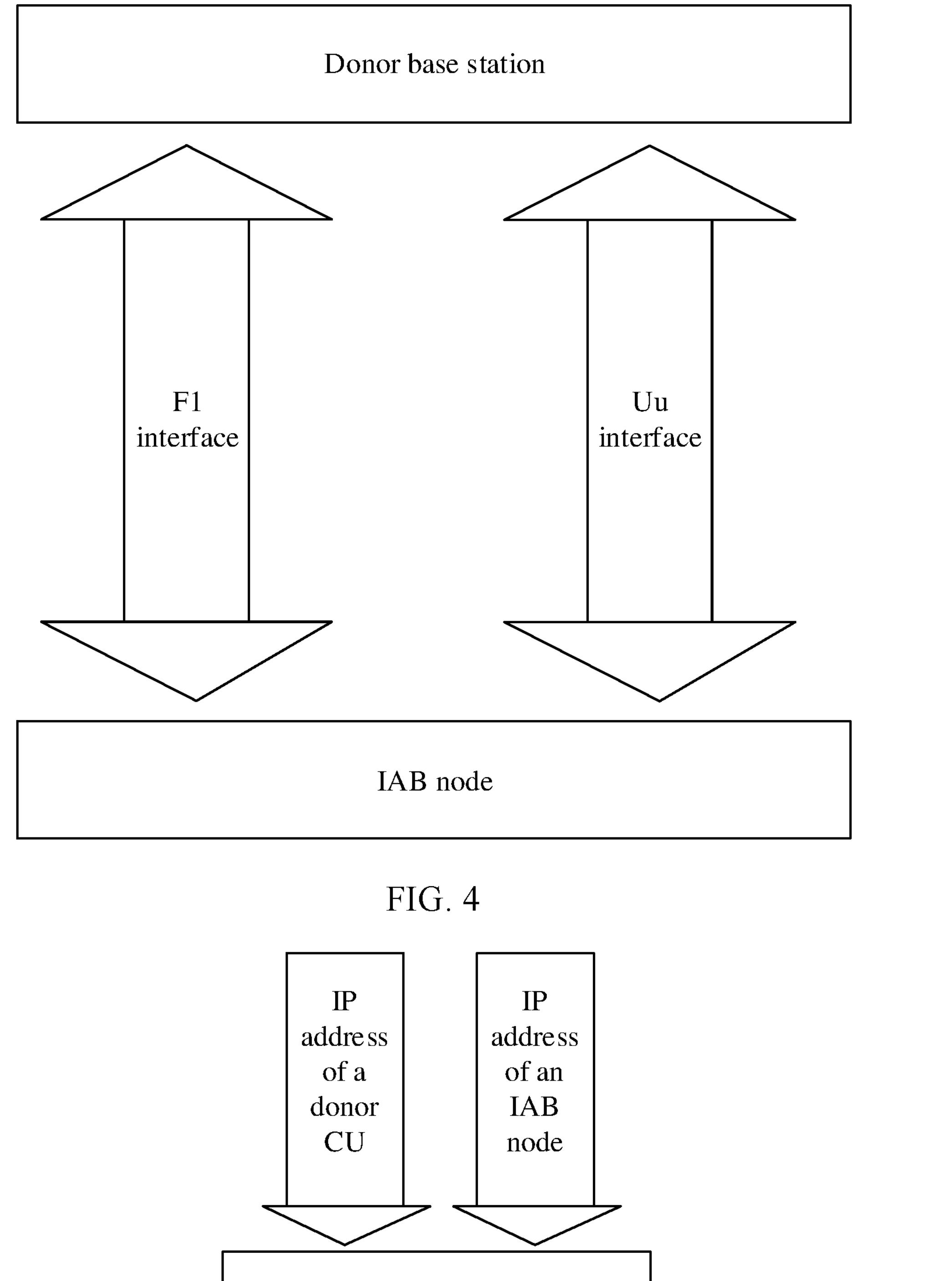
FIG. 4 is a schematic diagram of a key derivation method.
FIG. 5 is a schematic diagram of a communication scenario.

FIG. 4 is a schematic diagram of a communication scenario. As shown in FIG. 4, a donor base station (donor base station) and an IAB node are included. The donor base station may include a donor CU (donor CU) and at least one donor DU (donor DU). Communication interface between the donor base station and the IAB node may include an air interface (Uu interface) and an F1 interface. For example, the air interface (Uu interface) exists between an MT of the IAB node and the donor base station, and the F1 interface exists between a DU of the IAB node and the donor base station.

To ensure security of communication over an interface (for example, the F1 interface) between the IAB node and the donor base station, a security tunnel, for example, an internet protocol security (internet protocol security, IPsec) security tunnel, may be established between the IAB node and the donor base station. In a process of establishing the security tunnel, the IAB node and the donor base station use a same pre-shared key (per-shared key, PSK) (which may also be referred to as a KIAB key) as a credential for mutual authentication. In addition, the IAB node and the donor base station may also use the PSK to perform security protection on a control plane service or a data plane service transmitted over the F1 interface.

A key may also be used for security protection on the air interface (Uu interface) between the IAB node and the donor base station. In a process of establishing security protection, the IAB node and the donor base station use a same root key (root key) (which is also referred to as an access stratum root key (AS root key)). A root key used for communication over the Uu interface between the IAB node and the donor base station may be referred to as KgNB. The IAB node and the donor base station may derive an encryption or integrity protection key required for transmission over the Uu interface by using the root key, and then use the encryption or integrity protection key to perform encryption or integrity protection on an RRC message (the RRC message is carried and transmitted on an SRB (signaling radio bearer, signaling radio bearer)) or user plane data (the user plane data is carried and transmitted on a DRB (data radio bearer, data radio bearer)) transmitted over the Uu interface.

For example, the donor base station and the IAB node perform security protection on communication over the Uu interface by using a key A (for example, the KgNB), and perform security protection on communication over the F1 interface by using a key B (for example, the PSK). FIG. 5 shows an example of a derivation relationship between the key A and the key B. As shown in FIG. 5, the donor base station and the IAB node may use the key A, an IP address of the donor CU, and an IP address of the IAB node as input parameters of a key derivation function (key derivation function, KDF), and an output result of the KDF is the key B.

Forms of key derivation functions (KDFs) in the accompanying drawings of this application may be the same or different. The KDFs in this application may be constructed by using any key derivation algorithm, for example, by using a hash function. The KDFs in this application may be a key derivation function specified in a 3rd generation partnership project (3rd Generation Partnership Project, 3GPP) standard, or may be a key derivation function in another standard. This is not limited in this application.

The IP address of the IAB node in FIG. 5 may be allocated by the donor DU or a network management device to the IAB node. The IP address of the donor CU may also be allocated by the network management device. In this application, the network management device may include an operation, administration, and maintenance (operation, administration, and maintenance, OAM) network element, an element management system (element management system, EMS), a network management system (network management system, NMS), or the like.

Figure 6:
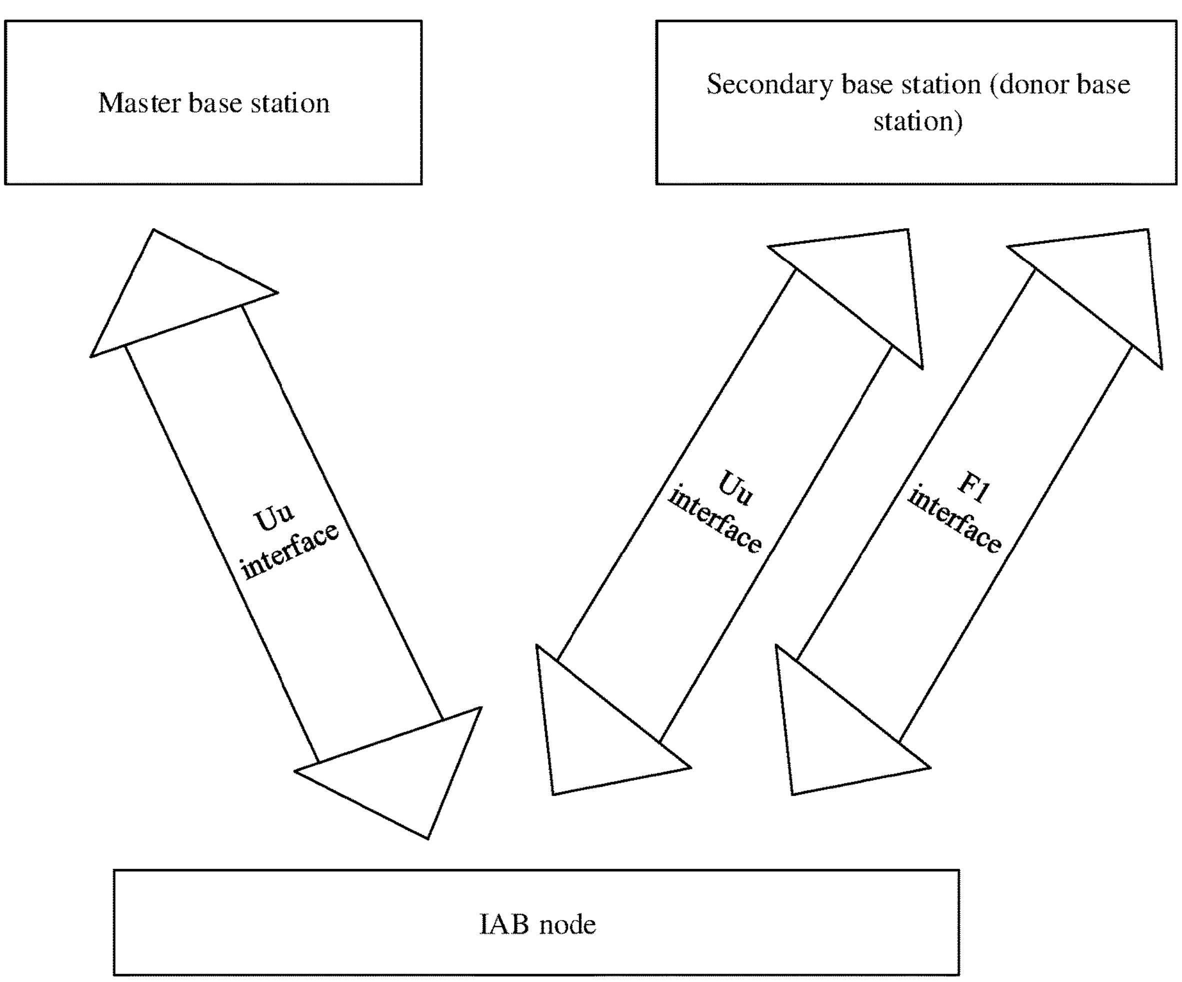
FIG. 6 is a schematic diagram of a communication scenario.

FIG. 6 is a schematic diagram of a dual connectivity communication scenario. As shown in FIG. 6, a master base station (master base station), a secondary base station (secondary base station), and an IAB node are included. A donor base station of the IAB is the secondary base station. A communication interface between the master base station and the IAB node includes an air interface (Uu interface). A communication interface between the secondary base station and the IAB node includes a Uu interface and an F1 interface.

To ensure security of communication over the F1 interface between the IAB node and the secondary base station, a security tunnel, for example, an IPsec security tunnel, may be established between the IAB node and the secondary base station. In a process of establishing the security tunnel, the IAB node and the secondary base station use a same PSK (which may also be referred to as KIAB) as a credential for mutual authentication. In addition, the IAB node and the secondary base station may further use the PSK to perform security protection on a control plane service or a data plane service transmitted over the F1 interface.

A root key (which may also be referred to as an access stratum root key) may be used for security protection on the Uu interface between the IAB node and the master base station. The root key used for communication over the Uu interface between the master base station and the IAB node may be referred to as KgNB. Similarly, a root key may also be used for security protection on the Uu interface between the IAB node and the secondary base station. The root key used for communication over the Uu interface between the secondary base station and the IAB node may be referred to as S-KgNB. For example, the master base station and the IAB node may use a key C (for example, the KgNB) to perform security protection on communication over the Uu interface. The secondary base station and the IAB node (for example, an IAB-MT) may use a key A (for example, the S-KgNB) to perform security protection on communication over the Uu interface. The secondary base station (for example, a donor CU) and the IAB node (for example, an IAB-DU) may perform security protection on communication over the F1 interface by using a key B (for example, a PSK). Optionally, for a derivation relationship between the key A and the key B, refer to the example shown in FIG. 5. In addition, the key A may be derived based on the key C, for example, the S-KgNB is derived by using the KgNB.

In the communication scenario shown in FIG. 6, one IAB node is connected to one donor base station (secondary base station), and the IAB node learns that a key (namely, the key B) used for communication over the F1 interface between the IAB node and the donor base station is derived based on a key (namely, the key A) used for communication over the Uu interface between the IAB node and the donor base station instead of a key (namely, the key C) used for communication over the Uu interface between the IAB node and the master base station.

Figure 7:
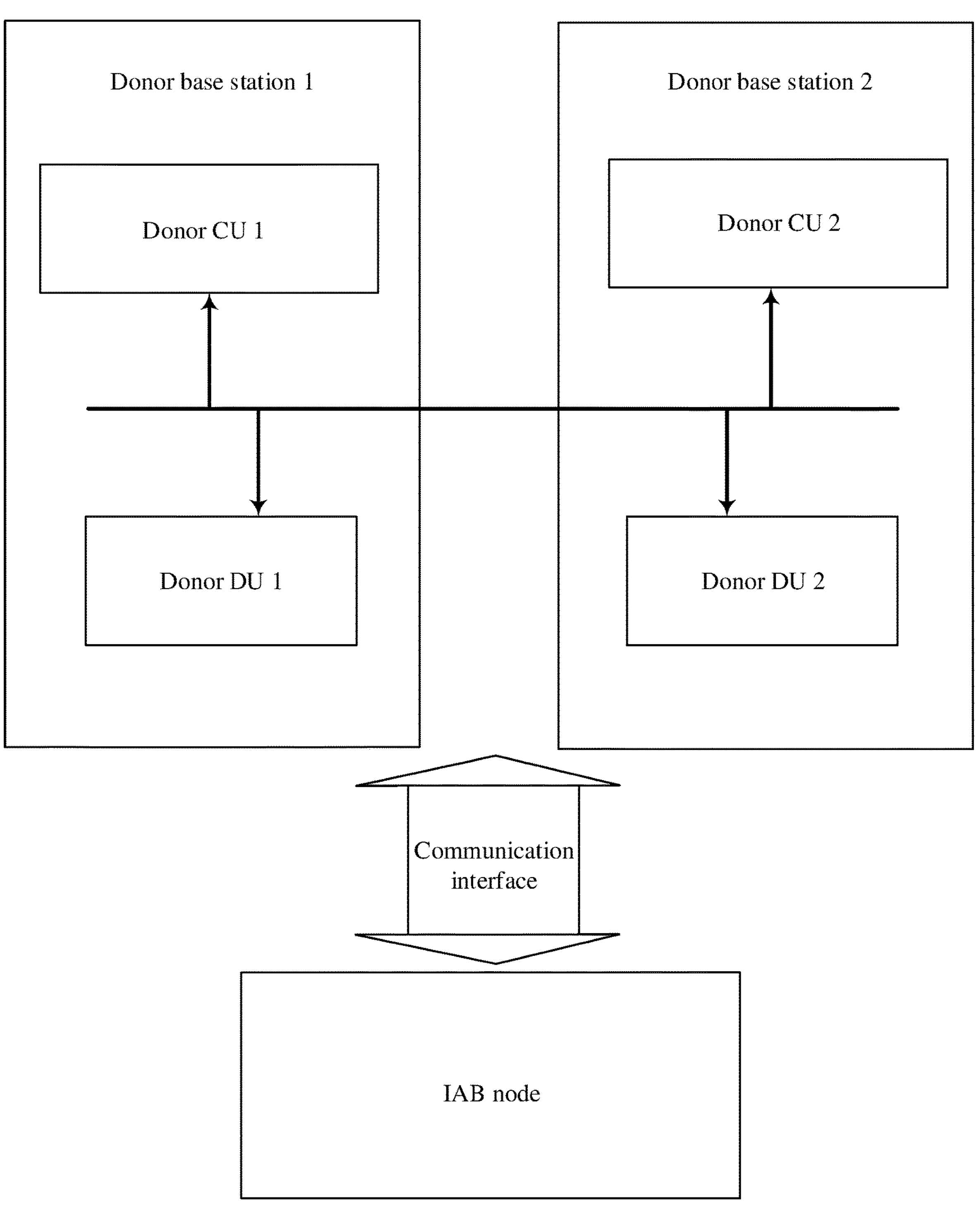
FIG. 7 is a schematic diagram of a communication scenario.
Figure 8:
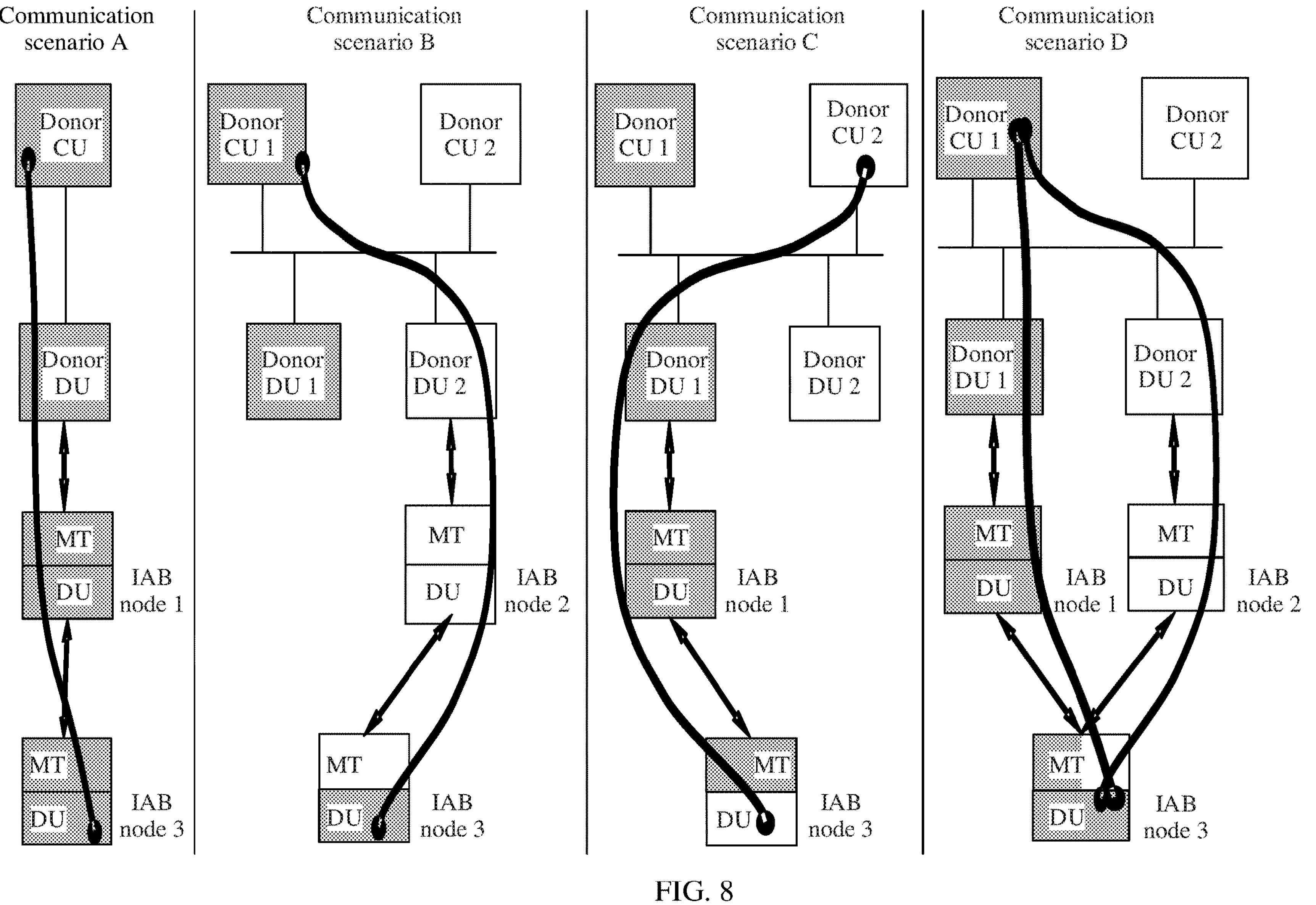
FIG. 8 is a schematic diagram of a communication scenario.

FIG. 7 is a schematic diagram of a communication architecture. As shown in FIG. 7, a donor base station 1 includes a donor CU 1 (donor CU 1) and a donor DU 1 (donor DU 1), and a donor base station 2 includes a donor CU 2 (donor CU 2) and a donor DU 2 (donor DU 2). A communication interface exists between an IAB node and the donor base station 1 or the donor base station 2. For example, the communication interface between the IAB node and the donor base station 1 or the donor base station 2 may include a Uu interface and/or an F1 interface. A communication interface also exists between the donor base station 1 and the donor base station 2. The donor CU 1 and the donor CU 2 may communicate with each other, for example, by using an X2 interface or an Xn interface. The donor CU 1 and the donor DU 2 may communicate with each other, and the donor CU 2 and the donor DU 1 may also communicate with each other. For example, communication may be implemented through an IP network. It may be understood that, the communication architecture shown in FIG. 7 may further include a downstream node or a descendant node of the IAB node, and an upstream node of the IAB node may be further included between the IAB node and the donor base station. FIG. 8 is a schematic diagram of a possible communication scenario in the communication architecture shown in FIG. 7. As shown in FIG. 8, the IAB node includes an MT part and a DU part (in this case, the IAB node is divided into two entities), or the IAB node includes an MT function and a DU function (in this case, the IAB node is an entity). The donor base station includes a donor CU entity and a donor DU entity (in this case, the donor base station is divided into two entities), or the donor base station includes a donor CU function and a donor DU function (in this case, the donor base station is still a whole). An upstream node, that is, an IAB node 2 (which is a parent node of an IAB node 3) further exists between the IAB node 3 and the donor base station. In FIG. 8, a rough curve is used to illustrate a possible path for communication over an F1 interface between the IAB node and the donor base station 1 or the donor base station 2 in each scenario. It may be understood that in FIG. 8, another upstream node of the IAB node 3 may be further included between the IAB node 3 and the IAB node 2, or between the IAB node 3 and an IAB node 1. In FIG. 8, another downstream node or descendant node of the IAB node 3 may also be included. In FIG. 8, the IAB node 1 may not exist, that is, the IAB node 3 may be directly connected to the donor base station 1. Alternatively, the IAB node 2 may not exist, that is, the IAB node 3 may be directly connected to the donor base station 2. The following describes several communication scenarios shown in FIG. 8.

Figures 9A, 9B:
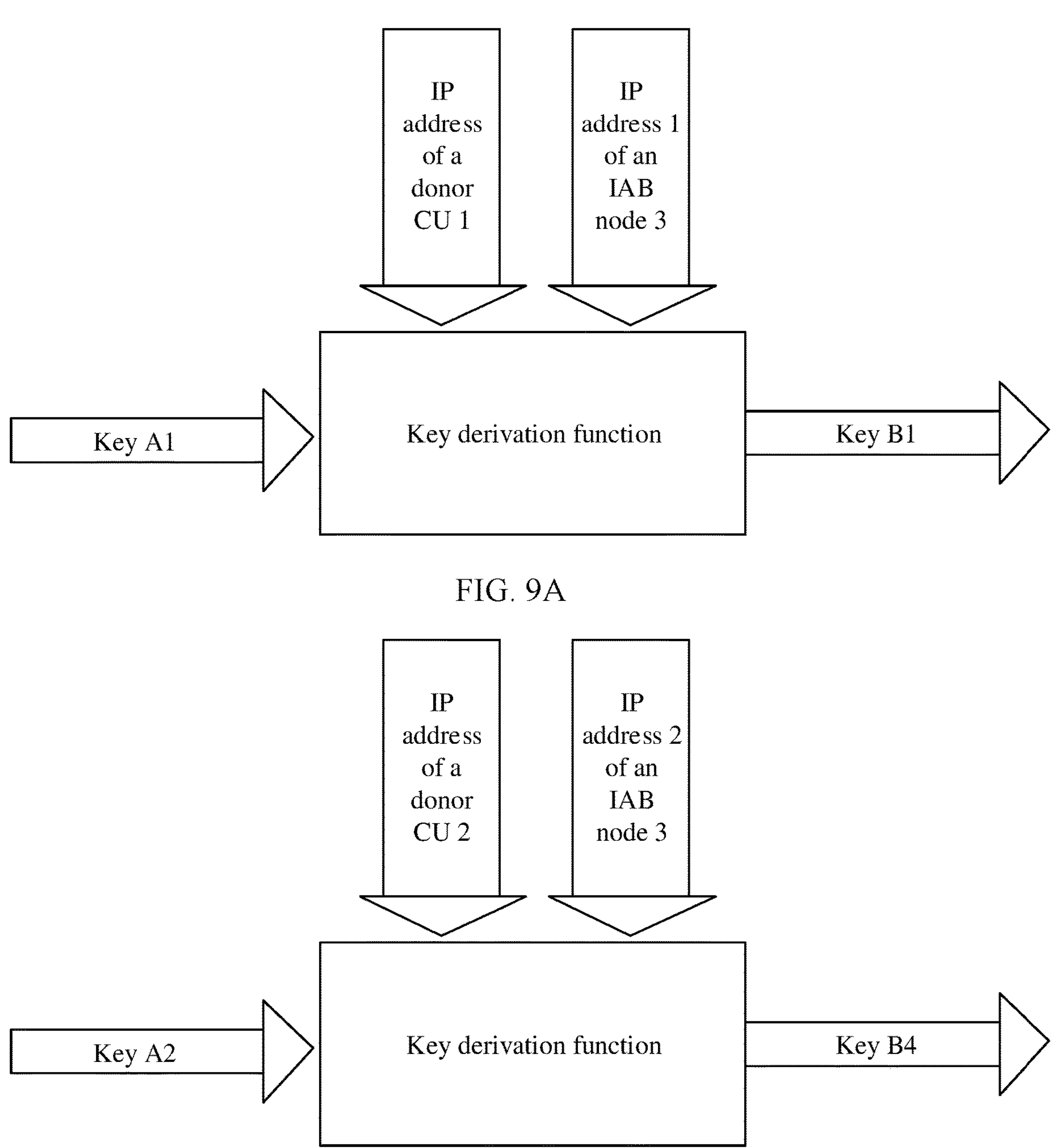
FIG. 9A is a schematic diagram of a key derivation method.
FIG. 9B is a schematic diagram of a key derivation method.

Communication scenario A: When a donor base station in the communication scenario A in FIG. 8 is the donor base station 1 (that is, a donor CU is a donor CU 1, and a donor DU is a donor DU 1), a Uu interface and an F1 interface exist between the IAB node 3 and the donor base station 1. Communication over the F1 interface between the IAB node 3 and the donor base station 1 needs to pass through the donor DU 1. The donor base station 1 (which may specifically be the donor CU 1) and the IAB node 3 (which may specifically be an IAB-MT) perform security protection on communication over the Uu interface by using a key A1 (for example, a KgNB 1). The donor base station 1 (which may specifically be the donor CU 1) and the IAB node 3 (which may specifically be an IAB-DU) perform security protection on communication over the F1 interface by using a key B1 (for example, a PSK 1). FIG. 9A shows an example of a derivation relationship between the key A1 and the key B1. FIG. 9A is a schematic diagram of a key derivation method. An IP address 1 of the IAB node 3 in FIG. 9A may be an IP address allocated by the donor DU 1 or the network management device to the IAB node 3. For example, the IP address 1 of the IAB node 3 and the donor DU 1 belong to a same network segment or have a same network prefix.

When a donor base station in the communication scenario A in FIG. 8 is the donor base station 2 (that is, a donor CU is a donor CU 2, and a donor DU is a donor DU 2), a Uu interface and an F1 interface exist between the IAB node 3 and the donor base station 2. Communication over the F1 interface between the IAB node 3 and the donor base station 2 needs to pass through the donor DU 2. The donor base station 2 (which may specifically be the donor CU 2) and the IAB node 3 (which may specifically be the IAB-MT) perform security protection on communication over the Uu interface by using a key A2 (for example, a KgNB 2). The donor base station 2 (which may specifically be the donor CU 2) and the IAB node 3 (which may specifically be the IAB-DU) perform security protection on communication over the F1 interface by using a key B4 (for example, a PSK 4). FIG. 9B shows an example of a derivation relationship between the key A2 and the key B4. An IP address 2 of the IAB node 3 in FIG. 9B may be an IP address allocated by the donor DU 2 or the network management device to the IAB node 3. In a possible design, the IP address 2 of the IAB node 3 and the donor DU 2 belong to a same network segment or have a same network prefix.

Figures 10, 11:
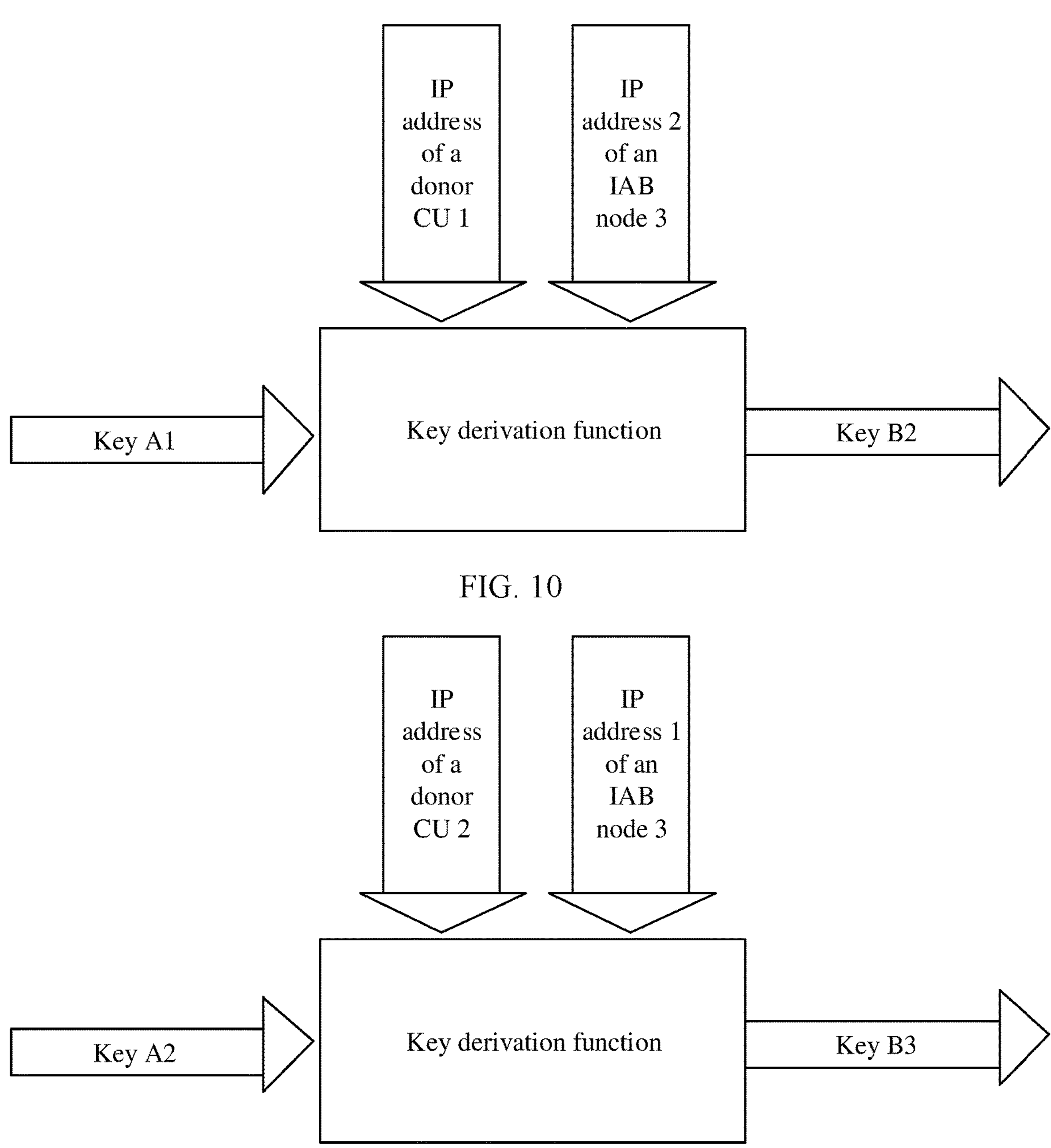
FIG. 10 is a schematic diagram of a key derivation method.
FIG. 11 is a schematic diagram of a key derivation method.

Communication scenario B: A Uu interface exists between the IAB node 3 and the donor base station 2 (including a donor CU 2 and a donor DU 2), and an F1 interface exists between the IAB node 3 and the donor base station 1. Communication over the F1 interface between the IAB node 3 and the donor base station 1 needs to pass through the donor DU 2. The donor base station 2 (which may specifically be the donor CU 2) and the IAB node 3 (which may specifically be the IAB-MT) perform security protection on communication over the Uu interface by using a key A2 (for example, a KgNB 2). The donor base station 1 (which may specifically be the donor CU 1) and the IAB node 3 (which may specifically be the IAB-DU) perform security protection on communication over the F1 interface by using a key B2 (for example, a PSK 2). The key B2 is derived based on a key A1 used for communication over a Uu interface between the IAB node 3 and the donor base station 1 (in this case, it may be understood that, in the communication scenario B, there is no Uu interface between the IAB node 3 and the donor base station 1 (in other words, no Uu interface is established between the IAB node 3 and the donor base station 1), however, the IAB node 3 may derive the key B2 by using the key A1 used for communication over the Uu interface between the IAB node 3 and the donor base station 1). FIG. 10 shows an example of a derivation relationship between the key A1 and the key B2. An IP address 2 of the IAB node 3 in FIG. 10 may be an IP address allocated by the donor DU 2 or the network management device to the IAB node 3. In a possible design, the IP address 2 of the IAB node 3 and the donor DU 2 belong to a same network segment or have a same network prefix.

Communication scenario C: A Uu interface exists between the IAB node 3 and the donor base station 1 (including a donor CU 1 and a donor DU 1), and an F1 interface exists between the IAB node 3 and the donor base station 2. In the communication scenario C, an F1 interface may or may not exist between the IAB node 3 and the donor base station 1 (in other words, no F1 interface is established between the IAB node 3 and the donor base station 1). Communication over the F1 interface between the IAB node and the donor base station 2 needs to pass through the donor DU 1. The donor base station 1 (which may specifically be the donor CU 1) and the IAB node 3 (which may specifically be the IAB-MT) perform security protection on communication over the Uu interface by using a key A1. The donor base station 2 (which may specifically be a donor CU 2) and the IAB node 3 (which may specifically be the IAB-DU) perform security protection on communication over the F1 interface by using a key B3 (for example, a PSK 3). The key B3 is derived based on a key A2 used for communication over a Uu interface between the IAB node 3 and the donor base station 2 (in this case, it may be understood that, in the communication scenario C, there is no Uu interface between the IAB node 3 and the donor base station 2 (in other words, no Uu interface is established between the IAB node 3 and the donor base station 2), however, the IAB node 3 may derive the key B3 by using the key A2 used for communication over the Uu interface between the IAB node 3 and the donor base station 2). FIG. 11 shows an example of a derivation relationship between the key A2 and the key B3. An IP address 1 of the TAB node 3 in FIG. 11 may be an IP address allocated by the donor DU 1 or the network management device to the TAB node 3. In a possible design, the IP address 1 of the TAB node 3 and the donor DU 1 belong to a same network segment or have a same network prefix.

Communication scenario D (which may also be referred to as a dual connectivity scenario): A Uu interface exists between the TAB node 3 and the donor base station 1 (including a donor CU 1 and a donor DU 1), and a Uu interface exists between the TAB node and the donor base station 2. An F1 interface exists between the TAB node 3 and the donor base station 1. Communication over the F1 interface between the TAB node 3 and the donor base station 1 may pass through either the donor DU 1 or a donor DU 2, that is, the donor base station 1 may select to pass through the donor DU 1 and/or the donor DU 2 to communicate with TAB node 3 over the F1 interface. The donor base station 1 (which may specifically be the donor CU 1) and the TAB node 3 (which may specifically be the IAB-MT) perform security protection on communication over the Uu interface by using a key A1. The donor base station 2 (which may specifically be a donor CU 2) and the TAB node 3 (which may specifically be the IAB-MT) perform security protection on communication over the Uu interface by using a key A2 (for example, an S-KgNB). The donor base station 1 (donor CU 1) and the TAB node 3 (which may specifically be the IAB-DU) may perform security protection on communication over the F1 interface that needs to pass through the donor DU 1 by using a key B1, or may perform security protection on communication over the F1 interface that needs to pass through the donor DU 2 by using a key B2. A derivation relationship between the key A1 and the key B1 may be shown in FIG. 9A. A derivation relationship between the key A1 and the key B2 may be shown in FIG. 10.

The communication scenarios A, B, C, and D of the IAB node 3 may be switched between each other. For example, when the IAB node 3 performs handover between donor base stations, the communication scenario A may be switched to the communication scenario B, or the communication scenario A may be switched to the communication scenario C. In this case, the donor base station 1 may be referred to as a source donor base station (source donor base station, S-donor), and the donor base station 2 may be referred to as a target donor base station (target donor base station, T-donor). The S-donor may further include an S-donor CU 1 and an S-donor DU 1. The T-donor may further include a T-donor CU 2 and a T-donor DU 2. A process in which the IAB node performs handover between donor base stations may be shown in FIG. 12.

Figure 12:
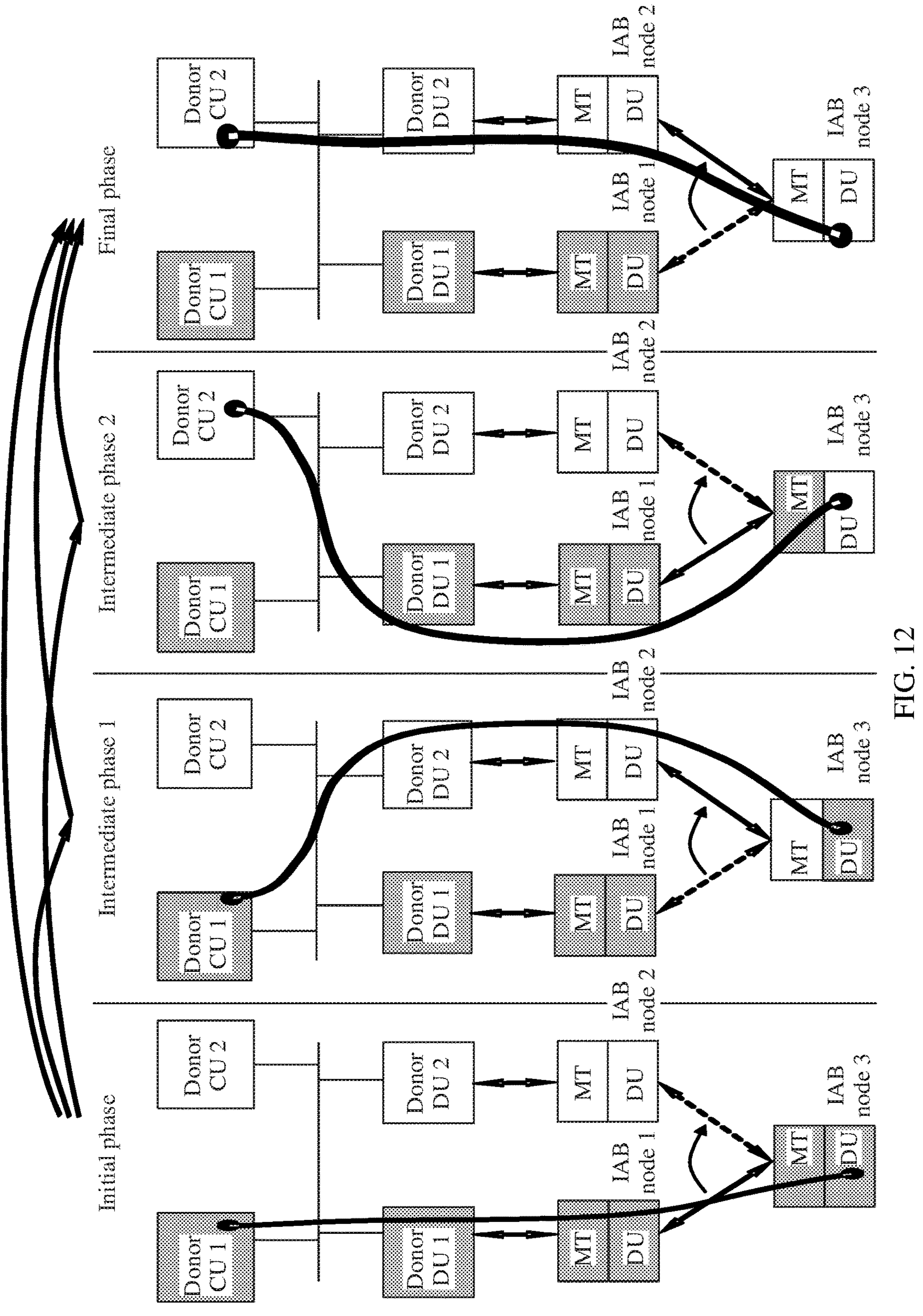
FIG. 12 is a schematic diagram of a handover process between donor base stations.

FIG. 12 is a schematic diagram of a handover process between donor base stations. Before performing handover between donor base stations, the IAB node 3 may be in an initial phase. For the description of the initial phase, refer to the description of the communication scenario A.

A possible handover process between donor base stations includes: After the IAB node 3 receives a message that comes from the donor base station 1 and that indicates the IAB node 3 to hand over from the donor base station 1 to the donor base station 2, an MT of the IAB node 3 is first handed over to the donor base station 2 (that is, an air interface is handed over from the donor base station 1 to the donor base station 2), and a DU of the IAB node 3 still maintains an F1 interface between the DU and the donor base station 1 (that is, the F1 interface is not handed over). In this case, the IAB node is in an intermediate phase 1. For communication between the IAB node 3 in the intermediate phase 1 and the donor base station 1 or the donor base station 2, refer to the foregoing description of the communication scenario B. Optionally, the IAB node 3 in the intermediate phase 1 may continue to hand over the F1 interface to the donor base station 2 (that is, disconnect the F1 interface between the IAB node 3 and the donor base station 1, and establish an F1 interface between the IAB node 3 and the donor base station 2). In this case, the IAB node enters a final phase.

Another possible handover process between donor base stations includes: The IAB node 3 establishes an F1 interface with the donor base station 2 based on received indication information, and the MT of the IAB node 3 still maintains a Uu interface with the donor base station 1 (that is, the Uu interface is not handed over). In this case, the IAB node is in an intermediate phase 2. The indication information may come from the donor base station 1, and may indicate the IAB node 3 (which may specifically be the DU of the IAB node 3) to establish an F1 interface with the donor base station 2. For example, the indication information carries an IP address of the donor CU 2. For communication between the IAB node 3 in the intermediate phase 2 and the donor base station 1 or the donor base station 2, refer to the foregoing description of the communication scenario C. Optionally, after the IAB node 3 receives a message that comes from the donor base station 1 and that indicates the IAB node 3 to hand over from the donor base station 1 to the donor base station 2, the IAB node 3 in the intermediate phase 2 may continue to hand over the Uu interface to the donor base station 2 (that is, disconnect the Uu interface between the MT of the IAB node 3 and the donor base station 1, and establish a Uu interface between the MT of the IAB node 3 and the donor base station 2). If an F1 interface exists between the IAB node 3 and the donor base station 1 in the communication scenario C or in the intermediate phase 2, the F1 interface between the IAB node 3 and the donor base station 1 may be disconnected, and the IAB node enters a final phase.

In this application, establishing an interface may include establishing a connection and/or a bearer on the interface. For example, establishing a Uu interface may include at least one of establishing an RRC connection, establishing an SRB, and establishing a DRB. Establishing an F1 interface may include establishing an F1 connection. Disconnecting an interface may include disconnecting a connection and/or a bearer on the interface. For example, disconnecting a Uu interface may include at least one of disconnecting an RRC connection, disconnecting an SRB, and disconnecting a DRB. Disconnecting an F1 interface may include disconnecting an F1 connection.

For another example, the IAB node 3 may alternatively switch from the communication scenario A or the communication scenario B to the dual connectivity communication scenario (the communication scenario D). In this case, the donor base station 1 may be referred to as a master donor base station (master donor base station, M-donor), and the donor base station 2 may be referred to as a secondary donor base station (secondary donor base station, S-donor). The M-donor may further include an M-donor CU 1 and an M-donor DU 1. The S-donor may further include an S-donor CU 2 and an S-donor DU 2.

With reference to schematic flowcharts of the communication methods provided in FIG. 13 to FIG. 16, the following further describes the solutions provided in this application based on the foregoing communication architectures and communication scenarios.

Figure 13:
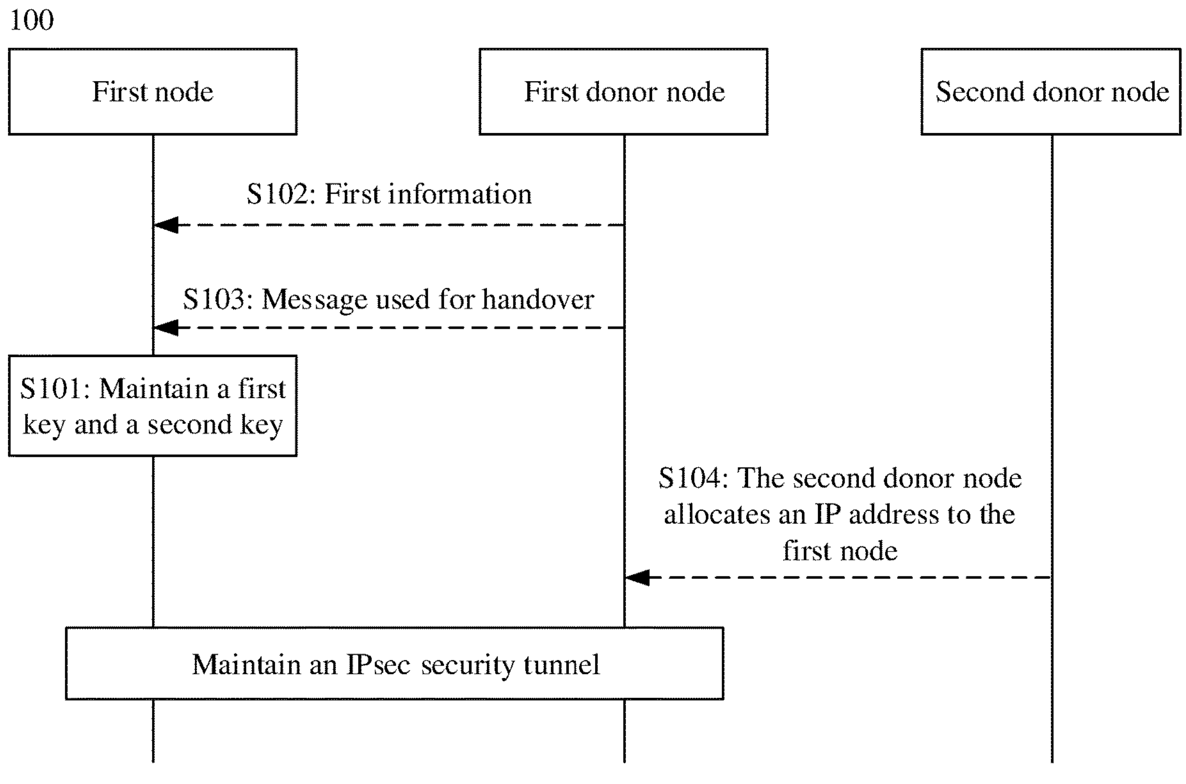
FIG. 13 is a schematic diagram of a communication method 100.

FIG. 13 provides a schematic flowchart of a communication method 100.

S101: A first node maintains a first key and a second key.

In this application, "maintaining the first key and the second key" may be understood as maintaining or retaining both the first key and the second key, or both the first key and the second key are saved or stored. In other words, the first key is not overwritten or replaced by the second key, and the second key is not overwritten or replaced by the first key.

Optionally, before S101 is performed, the method 100 may further include an operation S102: A first donor node sends first information to the first node.

The first node performs S101 in response to the first information. For example, the first information indicates the first node to maintain the first key, or the first information indicates the first node to maintain the first key and the second key.

Optionally, before S101 is performed, the method 100 may further include an operation S103: The first donor node sends, to the first node, a message used for handover. The message used for handover indicates the first node to hand over to a second donor node, or indicates the first node to hand over from the first donor node to the second donor node.

In a possible design, the message used for handover includes a handover command (handover command). The message used for handover may be carried in an RRC reconfiguration message sent by the first donor node to the first node.

Optionally, the message used for handover may carry the first information in S102. In this case, S102 and S103 may be combined.

The first key includes at least one of a key used for communication over a Uu interface between the first node and the first donor node, a key 1 used for communication over an F1 interface between the first node and the first donor node, or a key used for communication over an F1 interface between the first node and the second donor node. The second key includes a key used for communication over a Uu interface between the first node and the second donor node and/or a key 2 used for communication over the F1 interface between the first node and the first donor node. Optionally, the first key includes the key used for communication over the Uu interface between the first node and the second donor node. The second key includes a key 2 used for communication over the F1 interface between the first node and the first donor node.

In a possible implementation, the first node may be the IAB node 3 in FIG. 8 or FIG. 12, the first donor node may be the donor base station 1 in FIG. 8 or FIG. 12, and the second donor node may be the donor base station 2 in FIG. 8 or FIG. 12. The message used for handover in S103 may be a message that is sent by the donor base station 1 to the IAB node 3 in the foregoing communication scenario A or the initial phase and that indicates the IAB node 3 to perform handover between donor base stations. Handover between donor base stations includes a process of switching from the communication scenario A to the communication scenario B or a process of switching from the initial phase to the intermediate phase 1.

In this case, the first key includes at least one of the key A1 used for communication over the Uu interface between the IAB node 3 and the donor base station 1, the key B1 used for communication over the F1 interface between the IAB node 3 and the donor base station 1, or the key B4 used for communication over the F1 interface between the IAB node 3 and the donor base station 2. The second key includes the key A2 used for communication over the Uu interface between the IAB node 3 and the donor base station 2 and/or the key B2 used for communication over the F1 interface between the IAB node 3 and the donor base station 1. Optionally, in this case, the first key includes the key A2 used for communication over the Uu interface between the IAB node 3 and the donor base station 2, and the second key includes the key B2 used for communication over the F1 interface between the IAB node 3 and the donor base station 1.

When the IAB node 3 performs handover between donor base stations, the IAB node 3 may derive the key A2 by using the key A1 based on the message that is used for handover and that comes from the donor base station 1. For example, the IAB node 3 derives the key A2 by using the key A1 and a physical cell identifier (physical cell identifier, PCI) of a target cell (the target cell is a cell to which the donor base station 1 indicates that the IAB node 3 needs to be handed over) that is of the donor base station 2 and that is carried in the message used for handover. In this case, the key A1 may be a KgNB, and the key A2 may be a KgNB*. Keys B1, B2, and B4 are different PSKs.

The following specifically describes, by using several possible designs of the first key and the second key as examples, operations of an MT of the IAB node 3 and a DU of the IAB node 3 to maintain an IPsec security tunnel between the IAB node 3 and the donor base station 1 when the IAB node 3 switches from the communication scenario A to the communication scenario B or switches from the initial phase to the intermediate phase 1. For other possible cases of the first key and the second key, refer to the several possible designs for understanding.

Case 1: The first key includes the key A1 used for communication over the Uu interface between the IAB node 3 and the donor base station 1, and the second key includes the key A2 used for communication over the Uu interface between the IAB node 3 and the donor base station 2.

If the IAB-MT is responsible for deriving a key for communication over an F1 interface of the IAB node 3 (for example, deriving the key B1 or the key B2 from the key A1), and the IAB-MT maintains the key A1 and the key A2, the IAB-MT sends the key B2 to the IAB-DU after deriving the key B2 based on the key A1. The IAB-MT may actively send the key B2 to the IAB-DU, or may send, based on indication information from the IAB-DU, the donor base station 1 (which may specifically be the donor CU 1), or the donor base station 2 (which may specifically be the donor CU 2), the key B2 to the IAB-DU. For example, the indication information may include information about the donor CU 1. In this application, the information about the donor CU 1 may include identification information of the donor CU 1 (for example, an ID of the donor CU 1 or a name of the donor CU 1) or an IP address of the donor CU 1. For example, the IAB-MT stores a correspondence between the key A1 and the donor base station 1 (which may specifically be the donor CU 1) (in this case, the correspondence may specifically be a correspondence between the key A1 and the information about the donor CU 1). The IAB-MT may determine, based on the correspondence and the indication information, to derive the key B2 based on the key A1, and send the key B2 to the IAB-DU. Optionally, the indication information may indicate information indicating that the F1 interface of the IAB node is not changed (the indication information may specifically indicate that a peer end of the F1 interface of the IAB node is not changed). Alternatively, the indication information may indicate that the DU of the IAB node is not handed over or not migrated. The IAB-MT may determine, based on the indication information, to derive the key B2 based on the key A1, and send the key B2 to the IAB-DU.

If the IAB-MT is responsible for deriving the key used for communication over the F1 interface of the IAB node 3, and the key A1 and the key A2 are maintained by the IAB-DU (the key A1 and the key A2 that are maintained by the IAB-DU may be first obtained by the IAB-MT and then sent to the IAB-DU), the IAB-DU sends the key A1 to the IAB-MT. The IAB-MT derives the key B2 based on the key A1, and sends the key B2 to the IAB-DU. The IAB-DU may actively send the key A1 to the IAB-MT, or may send, based on indication information from the donor base station 1 (which may specifically be the donor CU 1) or the donor base station 2 (which may specifically be the donor CU 2), the key A1 to the IAB-MT. The indication information may include information about the donor CU 1. For example, the IAB-MT stores a correspondence between the key A1 and the donor base station 1 (which may specifically be the donor CU 1). The IAB-DU may determine, based on the correspondence and the indication information, to send the key A1 to the IAB-MT. In addition, the IAB-DU may determine to update an IPsec security tunnel between the IAB-DU and the donor base station 1 (which may specifically be the donor CU 1), and send the key A1 to the IAB-MT. If the IAB-DU is responsible for deriving the key used for communication over the F1 interface of the IAB node 3, and the IAB-MT maintains the key A1 and the key A2, the IAB-MT sends the key A1 to the IAB-DU, and the IAB-DU derives the key B2 based on the key A1. The IAB-MT may actively send the key A1 to the IAB-DU, or may send, based on indication information from the IAB-DU, the donor base station 1 (which may specifically be the donor CU 1), or the donor base station 2 (which may specifically be the donor CU 2), the key A1 to the IAB-DU. The indication information may include information about the donor CU 1. For example, the IAB-MT stores a correspondence between the key A1 and the donor base station 1 (which may specifically be the donor CU 1). The IAB-MT may determine, based on the correspondence and the indication information, to send the key A1 to the IAB-DU. Optionally, the indication information may include information indicating that the F1 interface of the IAB node is not changed. Alternatively, the indication information may indicate that the DU of the IAB node is not handed over or not migrated. The IAB-MT may determine, based on the indication information, to send the key A1 to the IAB-DU.

If the IAB-DU is responsible for deriving the key used for communication over the F1 interface of the IAB node 3, and the IAB-DU maintains the key A1 and the key A2, the IAB-DU derives the key B2 based on the key A1. The IAB-DU may determine, based on indication information from the donor base station 1 (which may specifically be the donor CU 1) or the donor base station 2 (which may specifically be the donor CU 2), to derive the key B2 based on the key A1. The indication information may include information about the donor CU 1. For example, the IAB-DU stores a correspondence between the key A1 and the donor base station 1 (which may specifically be the donor CU 1). The IAB-DU may determine, based on the correspondence and the indication information, to derive the key B2 based on the key A1. In addition, the IAB-DU may determine to update an IPsec security tunnel between the IAB-DU and the donor base station 1 (which may specifically be the donor CU 1), and derive the key B2 based on the key A1.

Case 2: The first key includes the key B1 and/or the key B4 that are/is used for communication over an F1 interface, and the second key includes the key B2 used for communication over an F1 interface.

If the IAB-MT maintains the first key and the second key, the IAB-MT sends the key B2 to the IAB-DU. The IAB-MT may actively send the key B2 to the IAB-DU, or may send, based on indication information from the IAB-DU, the donor base station 1 (which may specifically be the donor CU 1), or the donor base station 2 (which may specifically be the donor CU 2), the key B2 to the IAB-DU. The indication information may include information about the donor DU 2. In this application, the information about the donor DU 2 may include a BAP address (BAP address) of the donor DU 2. The IAB-MT stores a correspondence between the key B2 and the donor DU 2 (which may specifically be a correspondence between the key B2 and the information about the donor CU 2). The IAB-MT may send, based on the correspondence and the indication information, the key B2 to the IAB-DU. Optionally, the indication information may include IP address (which may specifically be an IP address allocated by the donor DU 2 to the IAB node) information of the IAB node 3. The IAB-MT stores a correspondence between the key B2 and the IP address information of the IAB node 3. The IAB-MT may send, based on the correspondence and the indication information, the key B2 to the IAB-DU. It should be noted that the foregoing indication information may further include indication information indicating that the F1 interface of the IAB node is not changed or indicating that the DU of the IAB node is not handed over or not migrated. For example, when the first key includes the key B4, and the second key includes the key B2, the IAB-MT may include not only a correspondence between the key B2 and the donor DU 2, but also a correspondence between the key B4 and the donor DU 2. For another example, when the first key includes the key B4, and the second key includes the key B2, the IAB-MT may include not only a correspondence between the key B2 and the IP address information of the IAB node 3, but also a correspondence between the key B4 and the donor DU 2. In this case, the IAB-MT may further determine, based on indication information indicating that the F1 interface of the IAB node is not changed or indicating that the DU of the IAB node is not handed over or not migrated, to send the key B2 to the IAB-DU.

If the IAB-DU maintains the first key and the second key, the IAB-DU may determine, based on indication information from the IAB-MT, the donor base station 1 (which may specifically be the donor CU 1), or the donor base station 2 (which may specifically be the donor CU 2), to use the key B2 to update the IPsec security tunnel between the IAB node 3 and the donor base station 1. The indication information may include information about the donor DU 2. The IAB-MT stores a correspondence between the key B2 and the donor DU 2. The IAB-MT may determine, based on the correspondence and the indication information, to use the key B2 to update the IPsec security tunnel between the IAB node 3 and the donor base station 1. Optionally, the indication information may include IP address information of the IAB node 3. For example, the IAB-DU stores a correspondence between the key B2 and an IP address of the IAB node 3. The IAB-DU may determine, based on the correspondence and the indication information, to use the key B2 to update the IPsec security tunnel between the IAB node 3 and the donor base station 1. It should be noted that the foregoing indication information may further include indication information indicating that the F1 interface of the IAB node is not changed or indicating that the DU of the IAB node is not handed over or not migrated. For example, when the first key includes the key B4, and the second key includes the key B2, the IAB-MT may include not only a correspondence between the key B2 and the donor DU 2, but also a correspondence between the key B4 and the donor DU 2. For another example, when the first key includes the key B4, and the second key includes the key B2, the IAB-MT may include not only a correspondence between the key B2 and the IP address information of the IAB node 3, but also a correspondence between the key B4 and the donor DU 2. In this case, the IAB-DU may further determine, based on indication information indicating that the F1 interface of the IAB node is not changed or indicating that the DU of the IAB node is not handed over or not migrated, to use the key B2 to update the IPsec security tunnel between the IAB node 3 and the donor base station 1.

The method 100 may further include an operation S104: The second donor node sends, to the first donor node, an IP address allocated by the second donor node to the first node.

For example, the donor base station 2 (which may specifically be the donor CU 2) sends, to the donor base station 1 (which may specifically be the donor CU 1), the IP address allocated by the donor base station 2 (which may specifically be the donor DU 2) to the IAB node.

In this way, the donor base station 1 (which may specifically be the donor CU 1) may derive the key B2 by using the IP address allocated by the donor base station 2 (which may specifically be the donor DU 2) to the IAB node, the key A1 used for communication over the Uu interface between the IAB node 3 and the donor base station 1, and an IP address of the donor base station 1 (which may specifically be the donor CU 1).

In this embodiment of this application, beneficial effects include, for example: in a process of switching from the communication scenario A to the communication scenario B or switching from the initial phase to the intermediate phase 1, the first donor node and the first node may still derive a same key (for example, a PSK) used for communication over the F1 interface between the first donor node and the first node by maintaining the first key and the second key instead of overwriting the first key by using the second key. Therefore, an IPsec security tunnel between the first node and the first donor node can be maintained, and further, interruption or security risks during communication of the first node can be reduced.

Optionally, after the IPsec security tunnel is successfully maintained between the IAB node 3 and the donor base station 1, the IAB node 3 may delete the key A1 and/or the key B1, to reduce storage overheads of the IAB node 3.

Optionally, after the IAB node 3 switches from the communication scenario A to the communication scenario B, or switches from the initial phase to the intermediate phase 1, the foregoing handover process between donor base stations may further include: The IAB node 3 (which may specifically be the DU of the IAB node 3) hands over the F1 interface from the donor base station 1 to the donor base station 2 (that is, disconnect the F1 interface between the IAB node 3 and the donor base station 1, and establish an F1 interface between the IAB node 3 and the donor base station 2). Further, after the IAB node 3 (which may specifically be the DU of the IAB node 3) hands over the F1 interface from the donor base station 1 to the donor base station 2, the IAB node 3 may delete the key A1, and at least one of the key B1 and the key B2, to further reduce storage overheads of the IAB node 3.

Figure 14:
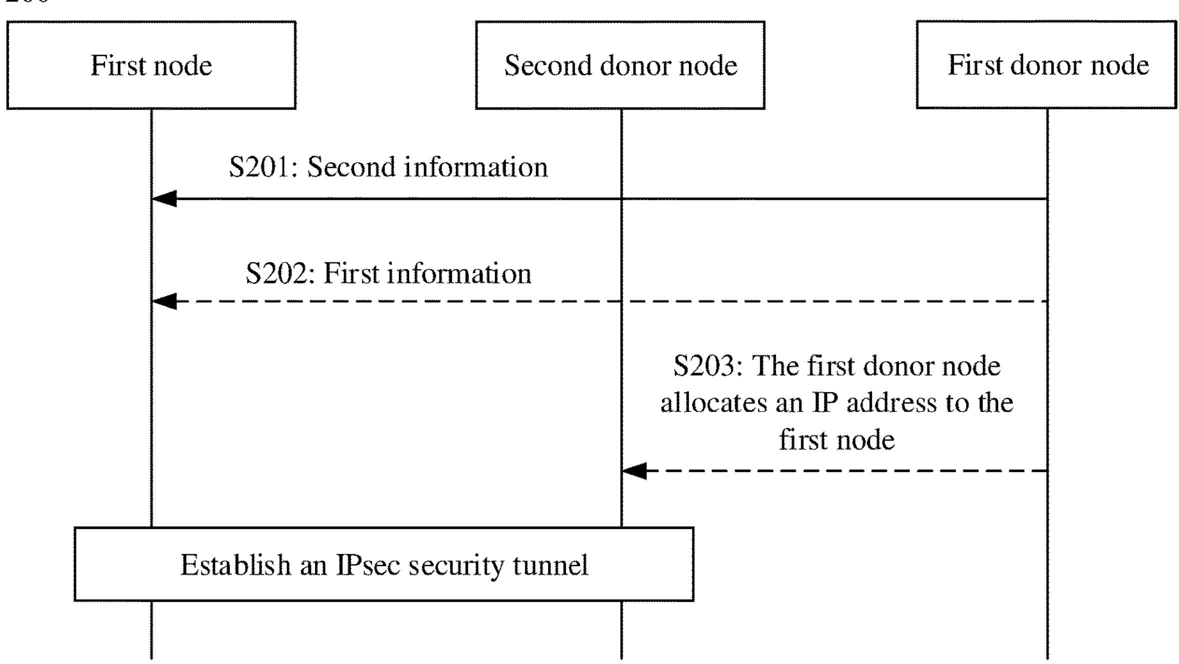
FIG. 14 is a schematic diagram of a communication method 200.

FIG. 14 provides a schematic diagram of a communication method 200.

S201: A first donor node sends second information to a first node.

The first donor node communicates with the first node by using a first key, where the first key includes a key used for communication over a Uu interface between the first node and the first donor node and/or a key used for communication over an F1 interface between the first node and the first donor node.

The second information may include an IP address of the second donor node and a second key. The second key includes a key used for communication over a Uu interface between the first node and the second donor node. Specifically, the first node may be the IAB node 3 in FIG. 8 or FIG. 12, the first donor node may be the donor base station 1 in FIG. 8 or FIG. 12, and the second donor node may be the donor base station 2 in FIG. 8 or FIG. 12. In this case, the first key includes the key A1 used for communication over the Uu interface between the IAB node 3 and the donor base station 1 and/or the key B1 used for communication over the F1 interface between the IAB node 3 and the donor base station 1. The second information includes an IP address of the donor CU 2 and the key A2 used for communication over the Uu interface between the IAB node 3 and the donor base station 2.

The second information may be carried in an F1AP message or an RRC message for sending. For example, different content included in the second information may be separately carried in different messages for sending. For example, an IP address that is of the second donor node and that is included in the second information is carried in the RRC message, and the key A2 included in the second information is carried in the F1AP message. For another example, the IP address that is of the second donor node and that is included in the second information is carried in the F1AP message, and the key A2 included in the second information is carried in the RRC message. Transmission security of the F1AP message is ensured by an IPsec security tunnel between the first node and the first donor node.

After receiving the second information, the IAB node 3 switches from the communication scenario A to the communication scenario C or switches from the initial phase to the intermediate phase 2. Optionally, the second information may be carried in indication information indicating the IAB node 3 (which may specifically be a DU of the IAB node 3) to establish an F1 interface with the donor base station 2. To switch from the communication scenario A to the communication scenario C, the IAB node 3 establishes an IPsec security tunnel between the IAB node 3 and the donor base station 2. In this case, a same PSK needs to be used as a credential for mutual authentication between the IAB node 3 and the donor base station.

For example, after the IAB node 3 receives the second information, in addition to the key A2, the IAB node 3 further includes at least one of the key A1 used for communication over the Uu interface between the IAB node 3 and the donor base station 1, the key B1 used for communication over the F1 interface between the IAB node 3 and the donor base station 1, the key B3 used for communication over the F1 interface between the IAB node 3 and the donor base station 2, or the key B4 used for communication over the F1 interface between the IAB node 3 and the donor base station 2. A derivation relationship between the key A1 and the key B1 is shown in FIG. 9A. A derivation relationship between the key A2 and the key B4 is shown in FIG. 9B. A derivation relationship between the key A2 and the key B3 is shown in FIG. 11. In this case, the key A1 may be a KgNB, and the key A2 may be a KgNB*. Keys B1, B3, and B4 are different PSKs.

The following describes, by using several cases in which the IAB node 3 maintains the foregoing keys as examples, operations of the MT of the IAB node 3 and the DU of the IAB node 3 to establish the IPsec security tunnel between the IAB node 3 and the donor base station 2 when the IAB node 3 switches from the communication scenario A to the communication scenario C or switches from the initial phase to the intermediate phase 2.

If the IAB-MT is responsible for deriving a key used for communication over an F1 interface of the IAB node 3 (for example, the key B1 is derived from the key A1) and a key used for communication over an F1 interface between the IAB node 3 and the donor base station 2 (for example, the key B3 or the key B4 is derived from the key A2), and keys maintained by the IAB-MT include the key A1 and the key A2 (the key A2 maintained by the IAB-MT may be first obtained by the IAB-DU from the second information and then sent to the IAB-MT), the IAB-MT derives the key B3 based on the key A2, and sends the key B3 to the IAB-DU. The IAB-MT may actively send the key B3 to the IAB-DU, or may send, based on indication information from the IAB-DU, the donor base station 1 (which may specifically be the donor CU 1), or the donor base station 2 (which may specifically be the donor CU 2), the key B3 to the IAB-DU. The indication information may include information about the donor CU 2. In this application, the information about the donor CU 2 may include identification information of the donor CU 2 (for example, an ID of the donor CU 2 or a name of the donor CU 2) or an IP address of the donor CU 2. For example, the IAB-MT stores a correspondence between the key A2 and the donor base station 2 (which may specifically be the donor CU 2). The IAB-MT may determine, based on the correspondence and the indication information, to derive the key B3 based on the key A2, and send the key B3 to the IAB-DU. Optionally, the indication information may include information indicating that the F1 interface of the IAB node is changed (the indication information may specifically indicate that a peer end of the F1 interface of the IAB node is changed). The IAB-MT may determine, based on the indication information, to derive the key B3 based on the key A2, and send the key B3 to the IAB-DU.

If the IAB-MT is responsible for deriving the key used for communication over the F1 interface of the IAB node 3 and the key used for communication over the F1 interface between the IAB node 3 and the donor base station 2, and keys maintained by the IAB-DU include the key A1 and the key A2 (the key A1 maintained by the IAB-DU may be first obtained by the IAB-MT and then sent to the IAB-DU), the IAB-DU sends the key A2 to the IAB-MT. The IAB-MT derives the key B3 based on the key A2, and sends the key B3 to the IAB-DU. The IAB-DU may actively send the key A2 to the IAB-MT, or may send, based on indication information from the donor base station 1 (which may specifically be the donor CU 1) or the donor base station 2 (which may specifically be the donor CU 2), the key A2 to the IAB-MT. The indication information may include information about the donor CU 2. For example, the IAB-DU stores a correspondence between the key A2 and the donor base station 2 (which may specifically be the donor CU 2). The IAB-DU may send, based on the correspondence and the indication information, the key A2 to the IAB-MT. In addition, the IAB-DU may determine to establish a new IPsec security tunnel between the IAB-DU and the donor base station 2 (which may specifically be the donor CU 2), and send the key A2 to the IAB-MT.

If the IAB-DU is responsible for deriving the key used for communication over the F1 interface of the IAB node 3 and the key used for communication over the F1 interface between the IAB node 3 and the donor base station 2, and keys maintained by the IAB-DU include the key A1 and the key A2, the IAB-DU derives the key B3 based on the key A2. The IAB-DU may determine, based on indication information from the donor base station 1 (which may specifically be the donor CU 1) or the donor base station 2 (which may specifically be the donor CU 2), to derive the key B3 based on the key A2. The indication information may include information about the donor CU 2. For example, the IAB-DU stores a correspondence between the key A2 and the donor base station 2 (which may specifically be the donor CU 2). The IAB-DU may determine, based on the correspondence and the indication information, to derive the key B3 based on the key A2. In addition, the IAB-DU may determine to establish a new IPsec security tunnel between the IAB-DU and the donor base station 2 (which may specifically be the donor CU 2), and derive the key B3 based on the key A2.

If the IAB-DU is responsible for deriving the key used for communication over the F1 interface of the IAB node 3 and the key used for communication over the F1 interface between the IAB node 3 and the donor base station 2, and keys maintained by the IAB-MT include the key A1 and the key A2, the IAB-MT sends the key A2 to the IAB-DU, and the IAB-DU derives the key B3 based on the key A2. The IAB-MT may actively send the key A2 to the IAB-DU, or may send, based on indication information from the IAB-DU, the donor base station 1 (which may specifically be the donor CU 1), or the donor base station 2 (which may specifically be the donor CU 2), the key A2 to the IAB-DU. The indication information may include information about the donor CU 2. For example, the IAB-MT stores a correspondence between the key A2 and the donor base station 2 (which may specifically be the donor CU 2). The IAB-MT may determine, based on the correspondence and the indication information, to send the key A2 to the IAB-DU. Optionally, the indication information may include information indicating that the F1 interface of the IAB node is changed. The IAB-MT may determine, based on the indication information, to send the key A2 to the IAB-DU.

If keys maintained by the IAB-MT include the key B3, and at least one of the key B1 and the key B4, the IAB-MT sends the key B3 to the IAB-DU. The IAB-MT may actively send the key B3 to the IAB-DU, or may send, based on indication information from the IAB-DU, the donor base station 1 (which may specifically be the donor CU 1), or the donor base station 2 (which may specifically be the donor CU 2), the key B3 to the IAB-DU. The indication information may include information about the donor DU 1. In this application, the information about the donor DU 1 may include a BAP address (BAP address) of the donor DU 1. The IAB-MT stores a correspondence between the key A2 or the key B3 and the donor DU 1 (which may specifically be a correspondence between the key A2 or the key B3 and the information about the donor DU 1). The IAB-MT may send, based on the correspondence and the indication information, the key B3 to the IAB-DU. Optionally, the indication information may include IP address (which may specifically be an IP address allocated by the donor DU 1 to the IAB node) information of the IAB node 3. The IAB-MT stores a correspondence between the key A2 or the key B3 and the IP address information of the IAB node 3. The IAB-MT may send, based on the correspondence and the indication information, the key B3 to the IAB-DU. It should be noted that the foregoing indication information may further include indication information indicating that the F1 interface of the IAB node is changed or indicating that the DU of the IAB node is handed over or migrated. For example, when keys maintained by the IAB-MT include both the key B1 and the key B3, the IAB-MT may include not only a correspondence between the key B1 and the donor DU 1, but also a correspondence between the key B3 and the donor DU 1. For another example, when keys maintained by the IAB-MT include both the key B1 and the key B3, the IAB-MT may include not only a correspondence between the key B1 and the IP address information of the IAB node 3, but also a correspondence between the key B3 and the donor DU 2. In this case, the IAB-MT may further determine, based on indication information indicating that the F1 interface of the IAB node is changed or indicating that the DU of the IAB node is handed over or migrated, to send the key B3 to the IAB-DU.

If keys maintained by the IAB-DU include the key B3, and at least one of the key B1 and the key B4, the IAB-DU may determine, based on indication information from the IAB-MT, the donor base station 1 (which may specifically be the donor CU 1), or the donor base station 2 (which may specifically be the donor CU 2), to use the key B3 to establish a new IPsec security tunnel between the IAB node 3 and the donor base station 2. The indication information may include information about the donor DU 1. The IAB-MT stores a correspondence between the key A2 or the key B3 and the donor DU 1. The IAB-MT may determine, based on the correspondence and the indication information, to use the key B3 to update the IPsec security tunnel between the IAB node 3 and the donor base station 1. Optionally, the indication information may include IP address information of the IAB node 3. For example, the IAB-DU stores a correspondence between the key A2 or the key B3 and the IP address of the IAB node 3. The IAB-DU may determine, based on the correspondence and the indication information, to use the key B3 to establish a new IPsec security tunnel between the IAB node 3 and the donor base station 2. The IAB-DU may determine, based on the indication information, to use the key B3 to establish the new IPsec security tunnel between the IAB node 3 and the donor base station 2. It should be noted that the foregoing indication information may further include indication information indicating that the F1 interface of the IAB node is changed or indicating that the DU of the IAB node is handed over or migrated. For example, when keys maintained by the IAB-MT include both the key B1 and the key B3, the IAB-MT may include not only a correspondence between the key B1 and the donor DU 1, but also a correspondence between the key B3 and the donor DU 1. For another example, when keys maintained by the IAB-MT include both the key B1 and the key B3, the IAB-MT may include not only a correspondence between the key B1 and the IP address information of the IAB node 3, but also a correspondence between the key B3 and the donor DU 2. In this case, the IAB-DU may further determine, based on the indication information indicating that the F1 interface of the IAB node is changed or indicating that the DU of the IAB node is handed over or migrated, to use the key B3 to update the IPsec security tunnel between the IAB node 3 and the donor base station 1.

Optionally, when the key A2 included in the second information is carried in an RRC message, the method 200 may further include S202: The first donor node sends first information to the first node. The first node maintains the foregoing keys in response to the first information. For example, the first information may indicate the first node to maintain the first key or a third key, the first information may indicate the first node to maintain the first key and the second key, the first information may indicate the first node to maintain the first key and the third key, or the first information may indicate the first node to maintain the second key and the third key. The third key includes the key used for communication over the F1 interface between the first node and the second donor node. Specifically, the first node may be the IAB node 3 in FIG. 8 or FIG. 12, the first donor node may be the donor base station 1 in FIG. 8 or FIG. 12, and the second donor node may be the donor base station 2 in FIG. 8 or FIG. 12. In this case, the third key includes the key B3 used for communication over the F1 interface between the IAB node 3 and the donor base station 2 and/or the key B4 used for communication over the F1 interface between the IAB node 3 and the donor base station 2.

The method 200 may further include operation S203: The first donor node sends, to the second donor node, an IP address allocated by the first donor node to the first node.

Specifically, the donor base station 1 (which may specifically be the donor CU 1) may send, to the donor base station 2 (which may specifically be the donor CU 2), the IP address allocated by the donor base station 1 (which may specifically be the donor DU 1) to the IAB node.

In this way, the donor base station 2 (which may specifically be the donor CU 2) may derive the key B3 by using the IP address allocated by the donor base station 1 (which may specifically be the donor DU 1) to the IAB node, the key A2 used for communication over the Uu interface between the IAB node 3 and the donor base station 2, and an IP address of the donor base station 2 (which may specifically be the donor CU 2).

In this embodiment of this application, beneficial effects include, for example: In a process of switching from the communication scenario A to the communication scenario C or switching from the initial phase to the intermediate phase 2, the second donor node and the first node may still have a same key (for example, a PSK) used for communication over the F1 interface between the second donor node and the first node by using the received second key. Therefore an IPsec security tunnel between the first node and the second donor node can be successfully established, and further, interruption or security risks during communication of the first node can be reduced.

Optionally, after the IPsec security tunnel is successfully established between the IAB node 3 and the donor base station 2, the IAB node 3 may delete the key A2 and/or the key B1, to reduce storage overheads of the IAB node 3. It should be noted that the IAB node 3 may derive the key A2 based on the key A1 after the IAB node 3 receives the message used for handover. Therefore, even if the key A2 is deleted, the IAB node 3 may obtain the key A2 again.

Optionally, after the IAB node 3 switches from the communication scenario A to the communication scenario C, or switches from the initial phase to the intermediate phase 2, the IAB node 3 (which may specifically be the MT of the IAB node 3) may hand over a Uu interface from the donor base station 1 to the donor base station 2 (that is, disconnect a Uu interface between the IAB node 3 and the donor base station 1, and establish a Uu interface between the IAB node 3 and the donor base station 2) based on the received message used for handover. Further, after the IAB node 3 (which may specifically be the MT of the IAB node 3) hands over the Uu interface from the donor base station 1 to the donor base station 2, the IAB node 3 may delete the key A1, and at least one of the key B1 and the key B3, to reduce storage overheads of the IAB node 3.

Figures 15, 16:
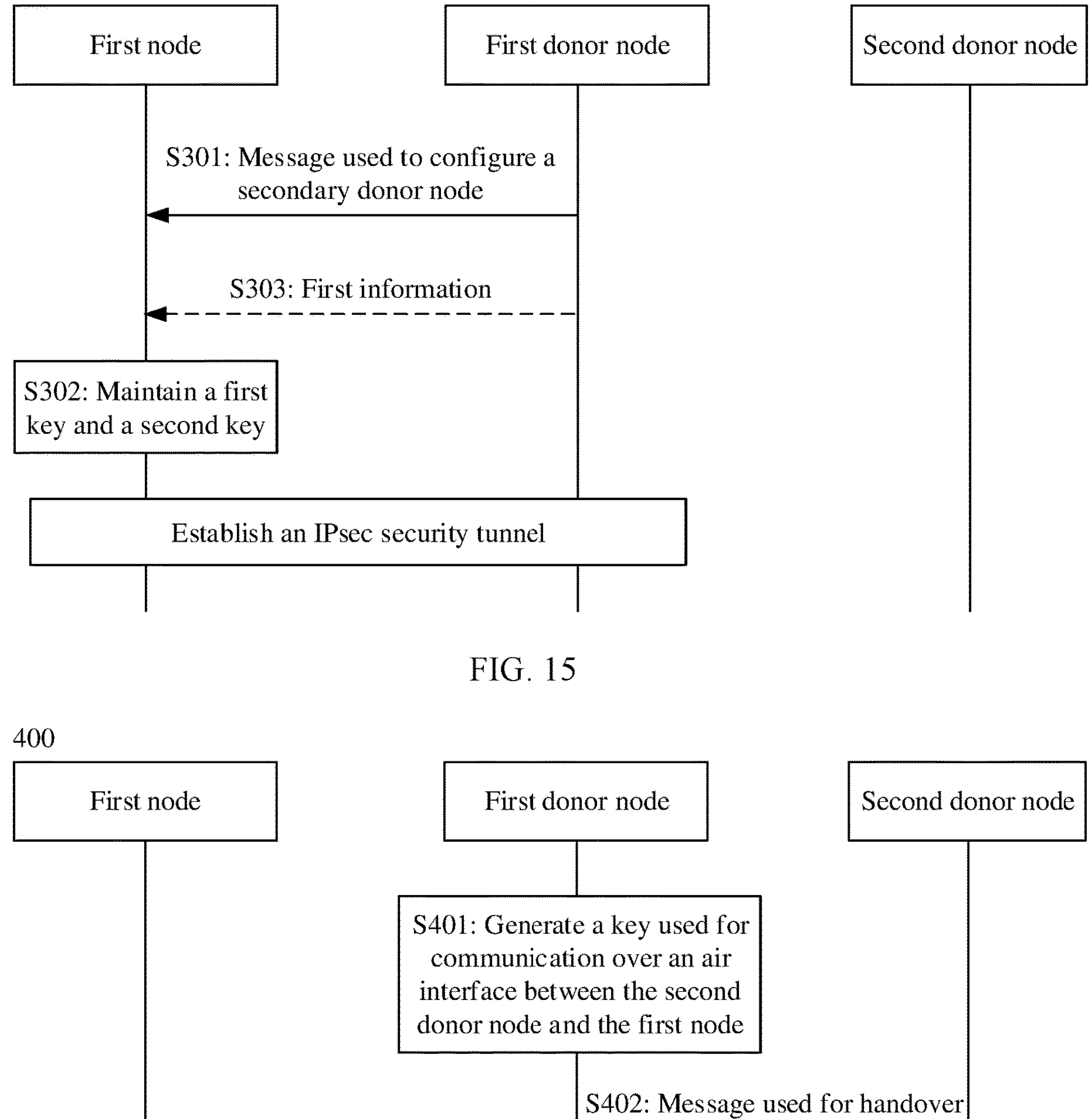
FIG. 15 is a schematic diagram of a communication method 300.
FIG. 16 is a schematic diagram of a communication method 400.

FIG. 15 is a schematic diagram of a communication method 300.

S301: A first donor node sends, to a first node, a message used to configure a secondary donor node.

The message used to configure the secondary donor node indicates to configure a second donor node as a secondary donor node of the first node or add the second donor node as the secondary donor node of the first node.

S302: The first node maintains a first key and a second key.

The first key includes a key used for communication over a Uu interface between the first node and the first donor node and/or a key 1 used for communication over an F1 interface between the first node and the first donor node. The second key includes a key used for communication over a Uu interface between the first node and the second donor node and/or a key 2 used for communication over the F1 interface between the first node and the first donor node.

Optionally, before the operation S302, the method 300 may further include an operation S303: The first donor node sends first information to the first node.

The first node maintains the first key and the second key in response to the first information. For example, the first information may indicate the first node to maintain the first key, or the first information may indicate the first node to maintain the first key and the second key.

Optionally, the message used to configure the secondary donor node in S301 may carry the first information. In this case, S301 and S303 may be combined.

The first node may be the IAB node 3 in FIG. 8 or FIG. 12, the first donor node may be the donor base station 1 in FIG. 8 or FIG. 12, and the second donor node may be the donor base station 2 in FIG. 8 or FIG. 12. After receiving the message used to configure the secondary donor node, the IAB node 3 switches from the communication scenario A to the communication scenario D.

In this case, the first key includes the key A1 used for communication over the Uu interface between the IAB node 3 and the donor base station 1 and/or the key B1 used for communication over the F1 interface between the IAB node 3 and the donor base station 1. The second key includes the key A2 used for communication over the Uu interface between the IAB node 3 and the donor base station 2 and/or the key B2 used for communication over the F1 interface between the IAB node 3 and the donor base station 1. A derivation relationship between the key A1 and the key B1 is shown in FIG. 9A. A derivation relationship between the key A1 and the key B2 is shown in FIG. 10. In this case, the key A1 may be a KgNB, and the key A2 may be an S-KgNB. Keys B1 and B2 are different PSKs.

The following describes operations of the MT of the IAB node 3 and the DU of the IAB node 3 to maintain an IPsec security tunnel between the IAB node 3 and the donor base station 1 in a process of switching from the communication scenario A to the communication scenario D by using several cases of the first key and the second key as examples.

Case 1: The first key includes the key A1 used for communication over the Uu interface between the IAB node 3 and the donor base station 1, and the second key includes the key A2 used for communication over the Uu interface between the IAB node 3 and the donor base station 2.

For the case 1, refer to the case 1 in the method 100. Details are not described herein again.

Case 2: The first key includes the key B1 used for communication over an F1 interface, and the second key includes the key B2 used for communication over an F1 interface.

If the IAB-MT maintains the first key and the second key, the IAB-MT sends the key B2 to the IAB-DU. The IAB-MT may actively send the key B2 to the IAB-DU, or may send, based on indication information from the IAB-DU, the donor base station 1 (which may specifically be the donor CU 1), or the donor base station 2 (which may specifically be the donor CU 2), the key B2 to the IAB-DU. The indication information may include information about the donor DU 2. The IAB-MT stores a correspondence between the key B2 and the donor DU 2 (which may specifically be a correspondence between the key B2 and the information about the donor DU 2). The IAB-MT may send, based on the correspondence and the indication information, the key B2 to the IAB-DU. Optionally, the indication information may include IP address (which may specifically be an IP address allocated by the donor DU 2 to the IAB node) information of the IAB node 3. The IAB-MT stores a correspondence between the IP address information of the IAB node 3 and the key B2. The IAB-MT may send, based on the correspondence and the indication information, the key B2 to the IAB-DU.

If the IAB-DU maintains the first key and the second key, the IAB-DU may determine, based on indication information from the IAB-MT, the donor base station 1 (which may specifically be the donor CU 1), or the donor base station 2 (which may specifically be the donor CU 2), to use the key B2 to update the IPsec security tunnel between the IAB node 3 and the donor base station 1. The indication information may include information about the donor DU 2. The IAB-MT stores a correspondence between the key B2 and the donor DU 2. The IAB-MT may determine, based on the correspondence and the indication information, to use the key B2 to update the IPsec security tunnel between the IAB node 3 and the donor base station 1. Optionally, the indication information may include IP address information of the IAB node 3. For example, the IAB-DU stores a correspondence between the key B2 and the IP address of the IAB node 3. The IAB-DU may determine, based on the correspondence and the indication information, to use the key B2 to update the IPsec security tunnel between the IAB node 3 and the donor base station 1.

In this embodiment of this application, beneficial effects include, for example: In a process of switching from the communication scenario A to the communication scenario D, the donor base station 1 and the IAB node 3 may establish a new IPsec security tunnel between the IAB node 3 and the donor base station 1 through the donor DU 2, so that it can be ensured that communication between the IAB node 3 and the donor base station 1 needs to pass through an F1 interface of the donor DU 1 and an F1 interface of the donor DU 2.

This application provides a communication method 400. FIG. 16 is a schematic diagram of the communication method 400.

S401: A first donor node generates a key used for communication over an air interface between a second donor node and a first node.

In a scenario in which the first node performs handover between donor base stations, the first donor node may be a source donor base station, and the second donor node may be a target donor base station.

If the first donor node determines that the first node needs to hand over to a first target cell under the second donor node, the first donor node derives a key used for communication over a Uu interface between the second donor node and the first node by using a PCI of the first target cell and a key used for communication over an air interface (Uu interface) between the first donor node and the first node.

S402: The second donor node sends a message used for handover to the first node through the first donor node.

The message used for handover may indicate the first node to hand over to the second donor node, or indicate the first node to hand over from the first donor node to the second donor node.

In a possible implementation, the message used for handover includes a handover command (handover command). The message used for handover may be carried in a handover request acknowledgement message sent by the second donor node to the first donor node. The message used for handover may alternatively be carried in an RRC reconfiguration message sent by the first donor node to the first node.

The message used for handover includes information indicating the PCI of the first target cell. For example, the information indicating the PCI of the first target cell may include second identification information that has a correspondence with the PCI of the first target cell. If the first node stores the correspondence between the second identification information and the PCI of the first target cell, the first node may determine the PCI of the first target cell based on the correspondence and the received second identification information.

The first node may derive, based on the message used for handover, the key used for communication over the Uu interface between the second donor node and the first node by using the PCI of the first target cell and the key used for communication over the air interface between the first donor node and the first node.

S403: The first node and the first donor node establish an IPsec security tunnel by using the key used for communication over the air interface between the second donor node and the first node.

The first node may derive, by using the key used for communication over the air interface between the second donor node and the first node, a key used for communication over an F1 interface between the first donor node and the first node. Similarly, the first donor node also derives, by using the key used for communication over the air interface between the second donor node and the first node, the key (for example, a PSK) used for communication over the F1 interface between the first donor node and the first node. In this way, the first node and the first donor node may use a same PSK as a credential for mutual authentication, so that the IPsec security tunnel between the first node and the first donor node can be maintained.

According to this embodiment of this application, beneficial effects include, for example: In a handover process between donor base stations, without increasing signaling overheads of the air interface between the first node and the first donor node, the first node and the first donor node may still derive a same key (for example, a PSK) used for communication over the F1 interface between the first donor node and the first node, to maintain the IPsec security tunnel between the first node and the first donor node, and reduce interruption or security risks during communication of the first node.

Based on the foregoing similar technical idea, an embodiment of this application provides a communication apparatus. The communication apparatus may be the first donor node, the second donor node, or the first node in any one of the possible design solutions of the methods 100 to 400 in the foregoing embodiments. The communication apparatus includes at least one corresponding unit configured to perform method steps, operations, or behavior performed by the first donor node, the second donor node, or the first node in the communication methods provided in the methods 100 to 400. The at least one unit may be configured to one-to-one correspond to a method step, an operation, or behavior performed by the first donor node, the second donor node, or the first node. These units may be implemented by using a computer program, may be implemented by using a hardware circuit, or may be implemented by using a computer program in combination with a hardware circuit.

Figure 17:
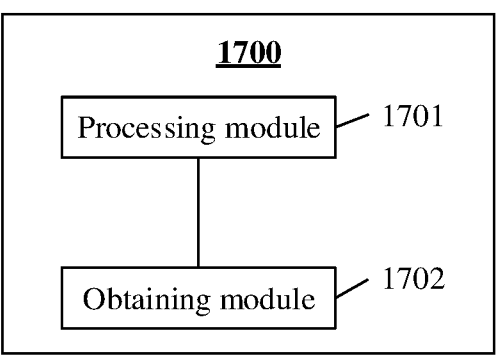
FIG. 17 is a schematic block diagram of a communication apparatus.
Figure 18:
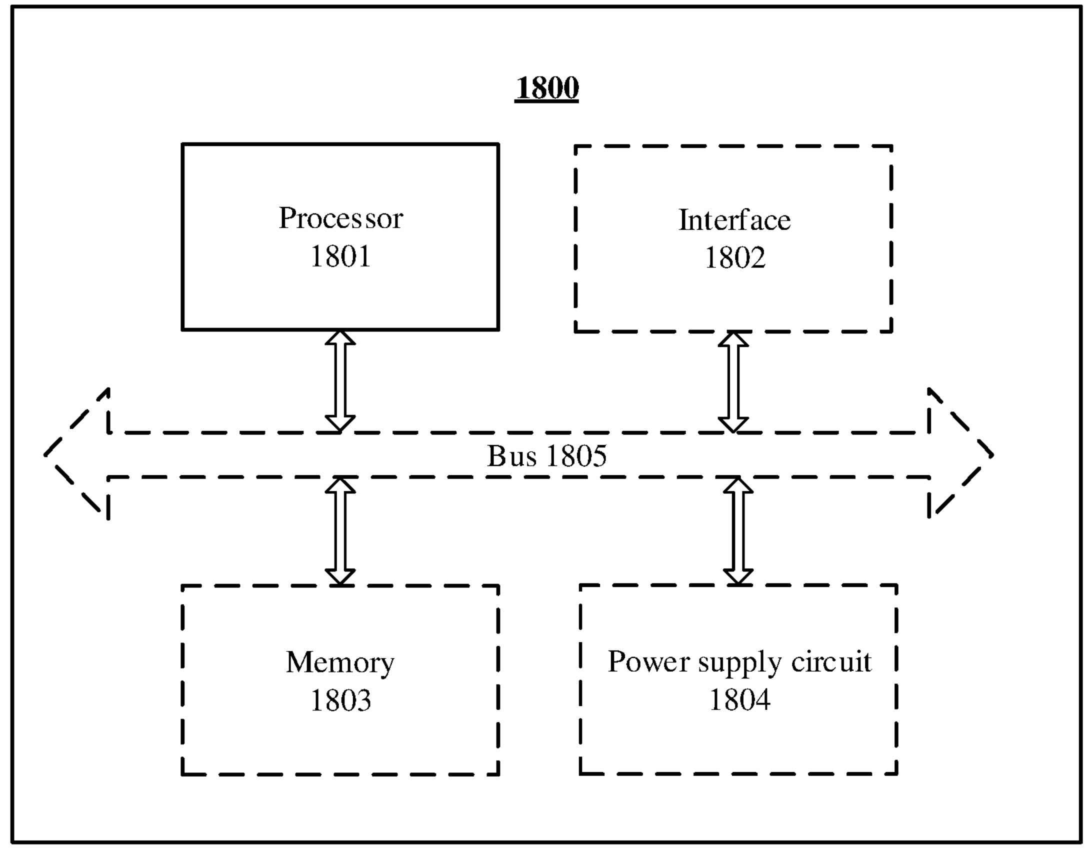
FIG. 18 is a schematic block diagram of an apparatus.

The following describes a communication apparatus provided in this application with reference to FIG. 17 and FIG. 18. As shown in FIG. 17, a communication apparatus 1700 may be used in a first node. The following describes in detail structures and functions of the communication apparatus 1700 in different designs. Although names of modules in different designs are the same, the structures and the functions may be different.

The communication apparatus 1700 may include a processing module 1701 and an obtaining module 1702. The processing module 1701 is configured to communicate with a first donor node by using a first key, where the first key includes a key used for communication over an air interface and/or a key 1 used for communication over an F1 interface. The obtaining module 1702 is configured to receive first information from the first donor node. The processing module 1701 is further configured to maintain the first key and a second key in response to the first information, where the second key includes a key used for communication over an air interface between the communication apparatus or the first node and a second donor node and/or a key 2 used for communication over the F1 interface.

The key 1 used for communication over the F1 interface is derived based on the key used for communication over the air interface, and the key 2 used for communication over the F1 interface is derived based on the key used for communication over the air interface with the second donor node.

For example, the key used for communication over the air interface includes a root key. The key 1 used for communication over the F1 interface includes a first PSK, and the key 2 used for communication over the F1 interface includes a second PSK.

The first information is carried in a message that indicates the first node to hand over to the second donor node. Optionally, the first information is carried in a message used to configure the second donor node as a secondary donor node of the first node.

For example, the first donor node is a source donor node, and the second donor node is a target donor node. Optionally, the first donor node is a primary donor node, and the second donor node is a secondary donor node.

In a possible implementation, the communication apparatus includes an MT and a DU. Further, the MT sends, to the DU based on indication information from the DU, the first donor node, or the second donor node, the key 2 used for communication over the F1 interface.

The indication information may include identification information, an IP address, or a BAP address of the first donor node. For example, the indication information specifically includes identification information of a CU of the first donor node, an IP address of the CU of the first donor node, or a BAP address of a DU of the first donor node.

If the MT stores a correspondence between the key 2 used for communication over the F1 interface and the first donor node, the MT specifically sends, to the DU, based on the indication information and the correspondence, the key 2 used for communication over the F1 interface.

Optionally, the indication information includes IP address information of the first node.

If the MT stores a correspondence between the key 2 used for communication over the F1 interface and the IP address information of the first node, the MT specifically sends, to the DU, based on the indication information and the correspondence, the key 2 used for communication over the F1 interface.

Optionally, the indication information includes indication information indicating that the DU of the first node is not handed over or not moved, or indicating that the F1 interface of the first node is not changed. Alternatively, the indication information indicates that the DU of the first node is not handed over or not moved, or indicates that the F1 interface of the first node is not changed.

As shown in FIG. 18, the communication apparatus 1800 includes one or more processors 1801, and optionally, further includes an interface 1802. When related program instructions are executed in at least one processor 1801, the apparatus 1800 may be enabled to implement the communication method provided in any one of the foregoing embodiments and any one of the possible designs thereof. Alternatively, the processor 1801 is configured to implement, by using a logic circuit or executing code instructions, the communication method provided in any one of the foregoing embodiments and any one of the possible designs thereof. The interface 1802 may be configured to receive program instructions and transmit the program instructions to the processor, or the interface 1802 may be configured to perform communication interaction between the apparatus 1800 and another communication device, for example, exchange control signaling and/or service data. For example, the interface 1802 may be configured to: receive a signal from the another apparatus other than the apparatus 1800, and transmit the signal to the processor 1801, or send a signal from the processor 1801 to the another communication apparatus other than the apparatus 1800. The interface 1802 may be a code and/or data read/write interface circuit, or the interface 1802 may be a signal transmission interface circuit between a communication processor and a transceiver, or may be a pin of a chip. Optionally, the communication apparatus 1800 may further include at least one memory 1803, and the memory 1803 may be configured to store required program instructions and/or data. Optionally, the apparatus 1800 may further include a power supply circuit 1804, where the power supply circuit 1804 may be configured to supply power to the processor 1801, and the power supply circuit 1804 and the processor 1801 may be located in a same chip, or may be located in another chip other than a chip in which the processor 1801 is located. Optionally, the apparatus 1800 may further include a bus 1805, and parts of the apparatus 1800 may be interconnected through the bus 1805.

It should be understood that the processor in this embodiment of this application may be a central processing unit (central processing unit, CPU), or the processor may be another general-purpose processor, a digital signal processor (digital signal processor, DSP), an application-specific integrated circuit (application-specific integrated circuit, ASIC), a field-programmable gate array (field-programmable gate array, FPGA) or another programmable logic device, a discrete gate or a transistor logic device, a discrete hardware component, or the like. The general-purpose processor may be a microprocessor or the processor may be any conventional processor or the like.

It should be further understood that the memory in this embodiment of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example but not limitation, many forms of a random access memory (random access memory, RAM) are available, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), or a direct rambus random access memory (direct rambus RAM, DR RAM).

The power supply circuit in this embodiment of this application includes but is not limited to at least one of the following: a power supply line, a power supply subsystem, a power management chip, a power consumption management processor, or a power consumption management control circuit.

A transceiver apparatus, an interface, or a transceiver in this embodiment of this application may include a separate transmitter and/or a separate receiver, or may be integrated with a transmitter and a receiver. The transceiver apparatus, the interface, or the transceiver may operate under an indication of a corresponding processor. Optionally, the transmitter may correspond to a transmitter machine in a physical device, and the receiver may correspond to a receiver machine in the physical device.

It may be clearly understood by a person skilled in the art that, for the purpose of convenient and brief description, division of the foregoing functional modules is used as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In embodiments of this application, it should be understood that the disclosed systems, apparatuses, and methods may be implemented in other manners. For example, the described apparatus embodiments are merely examples. For example, division into the modules or units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

A person of ordinary skill in the art may be aware that, in combination with examples described in embodiments disclosed in this specification, units or algorithm operations may be implemented by hardware, software, or a combination of software and hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In this application, "implemented by software" may mean that a processor reads and executes program instructions stored in a memory to implement a function corresponding to the foregoing module or unit. The processor is a processing circuit that has a function of executing the program instructions, and includes but is not limited to at least one of the following various processing units that can execute the program instructions such as a central processing unit (central processing unit, CPU), a microprocessor, a digital signal processor (digital signal processor, DSP), a microcontroller (microcontroller unit, MCU), or an artificial intelligence processor. In some other embodiments, the processor may further include another processing function circuit (for example, a hardware circuit, a bus, and an interface that are used for hardware acceleration). The processor may be presented in a form of an integrated chip. For example, the processor may be presented in a form of an integrated chip whose processing function includes only a function of executing software instructions; or the processor may be presented in a form of a system-on-a-chip (system-on-a-chip, SoC). To be specific, on one chip, in addition to the processing circuit (which is usually referred to as a "core") that can execute the program instructions, another hardware circuit (certainly, the another hardware circuit may alternatively be independently implemented based on an ASIC or an FPGA) configured to implement a specific function is further included. Correspondingly, in addition to the function of executing software instructions, processing functions may further include various hardware acceleration functions (such as AI computing, encoding and decoding, and compression and decompression).

In this application, "implemented by hardware" means that a function of the foregoing module or unit is implemented through a hardware processing circuit that does not have a function of processing program instructions. The hardware processing circuit may include a discrete hardware component, or may be an integrated circuit. To reduce power consumption and a size, an integrated circuit is usually used for implementation. The hardware processing circuit may include an ASIC, or a programmable logic device (programmable logic device, PLD). The PLD may further include an FPGA, a complex programmable logic device (complex programmable logic device, CPLD), or the like. These hardware processing circuits may be an independently packaged semiconductor chip (for example, packaged into an ASIC), or may be integrated with another circuit (such as a CPU or a DSP) and then packaged into a semiconductor chip. For example, a plurality of types of hardware circuits and CPUs may be formed on a silicon base, and are independently packaged into a chip, where the chip is also referred to as a SoC. Alternatively, a circuit and a CPU that are configured to implement an FPGA function may be formed on a silicon base, and are independently packaged into a chip, where the chip is also referred to as a system-on-a-programmable-chip (system-on-a-programmable-chip, SoPC).

It should be noted that, in this application, when software, hardware, or a combination of software and hardware are used for implementation, different software and hardware may be used. This is not limited to only one type of software or hardware. For example, one of the modules or units may be implemented by using a CPU, and another module or unit may be implemented by using a DSP. Similarly, when hardware is used for implementation, one of the modules or units may be implemented by using an ASIC, and another module or unit may be implemented by using an FPGA. Certainly, it is also not specified that some or all modules or units are implemented by using a same type of software (for example, through the CPU) or a same type of hardware (for example, through the ASIC). In addition, a person skilled in the art may learn that, software usually has better flexibility but poorer performance than hardware, and hardware is exactly opposite. Therefore, a person skilled in the art may select software, hardware, or a combination thereof for implementation based on an actual requirement.

In the foregoing embodiments, the description of each embodiment has respective focuses. For a part that is not described in detail in an embodiment, reference may be made to related descriptions in other embodiments. Embodiments of this application may be combined, or some technical features in embodiments may be decoupled from specific embodiments and combined with a conventional technology, to resolve the technical problem in embodiments of this application.

In embodiments of this application, the units described as separate components may or may not be physically separate, and components displayed as units may or may not be physical units, may be located in one position, or may be distributed on a plurality of network units. Some or all of the units may be selected based on actual requirements to achieve the objectives of the solutions of embodiments in this application.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in the form of a software product. The computer software product is stored in a storage medium and may include several instructions for instructing a computer device, for example, a personal computer, a server, or a network device, or a processor (processor) to perform all or a part of the operations of the methods described in embodiments of this application. The foregoing storage medium may include any medium or computer-readable storage medium that can store program code, such as a USB flash drive, a removable hard disk, a read-only memory (read-only memory, ROM), a random access memory (random access memory, RAM), a magnetic disk, or an optical disc.

In the description of this application, terms such as "first", "second", "S101", or "S102" are used only for the purpose of distinguishing description and context convenience. Different sequence numbers do not have specific technical meanings, and cannot be understood as indicating or implying relative importance, or indicating or implying an execution sequence of operations.

The term "and/or" in this application describes only an association relationship for associated objects, and indicates that three relationships may exist. For example, "A and/or B" may indicate the following three cases: Only A exists; both A and B exist; or only B exists. A and B may be singular or plural. In addition, the character "/" in this specification indicates an "or" relationship between the associated objects.

In this application, "transmission" may include the following three cases: data sending, data receiving, or data sending and data receiving. In this application, "data" may include service data and/or signaling data.

In this application, the terms "include" or "have" and any variation thereof are intended to cover non-exclusive inclusion. For example, a process/method that includes a series of steps, or a system/product/device that includes a series of units is not necessarily limited to those expressly listed steps or units, but may include other steps or units not explicitly listed or inherent to these processes/methods/products/devices.

In the description of this application, unless otherwise specified, a quantity of nouns indicates "a singular noun or a plural noun", that is, "one or more", "at least one" indicates one or more, and "including at least one of the following: A, B, and C" indicates that A is included, B is included, C is included, A and B are included, A and C are included, B and C are included, or A, B, and C are included, where A, B, and C may be single or plural.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A communication method, comprising:

communicating, by a first node, with a first donor node by using a first key, wherein the first key comprises at least one of a key used for communication over an air interface or a key 1 used for communication over an F1 interface;

receiving, by the first node, first information from the first donor node; and maintaining, by the first node, the first key and a second key in response to the first information, wherein the second key comprises a key used for communication over an air interface between the first node and a second donor node to which the first node hands over and a key 2 used for communication over the F1 interface.

2. The communication method according to claim 1, wherein the key used for communication over the air interface comprises a root key.

3. The communication method according to claim 1, wherein the first information is carried in a message indicating the first node to hand over to the second donor node; or the first information is carried in a message used to configure the second donor node as a secondary donor node of the first node.

4. The communication method according to claim 1, wherein the first donor node is a source donor node, and the second donor node is a target donor node.

5. The communication method according to claim 1, wherein the second donor node sends, to the first donor node, an internet protocol (IP) address allocated by the second donor node to the first node.

6. The communication method according to claim 1, wherein the key used for communication over an air interface between the first node and a second donor node to which the first node hands over is generated by using a physical cell identifier (PCI) of a first target cell under the second donor node.

7. A communication apparatus, wherein the apparatus comprises one or more processors and an interface, wherein the one or more processors are configured to enable the apparatus to:

communicate with a first donor node by using a first key, wherein the first key comprises at least one of a key used for communication over an air interface or a key 1 used for communication over an F1 interface;

receive first information from the first donor node; and maintain the first key and a second key in response to the first information, the second key comprises a key used for communication over an air interface between a first node and a second donor node to which the first node hands over and a key 2 used for communication over the F1 interface.

8. The apparatus according to claim 7, wherein the key used for communication over the air interface comprises a root key.

9. The apparatus according to claim 7, wherein the first information is carried in a message indicating the first node to hand over to the second donor node; or the first information is carried in a message used to configure the second donor node as a secondary donor node of the first node.

10. The apparatus according to claim 7, wherein the first donor node is a source donor node, and the second donor node is a target donor node.

11. The apparatus according to claim 7, wherein the apparatus is the first node.

12. The apparatus according to claim 7, wherein the apparatus is a chip in the first node.

13. The apparatus according to claim 7, wherein the second donor node sends, to the first donor node, an internet protocol (IP) address allocated by the second donor node to the first node.

14. The apparatus according to claim 7, wherein the key used for communication over an air interface between the first node and a second donor node to which the first node hands over is generated by using a physical cell identifier (PCI) of a first target cell under the second donor node.

15. A non-transitory computer readable medium storing instructions that are executable by a computer to cause a first node to perform operations comprising:

communicating with a first donor node by using a first key, wherein the first key comprises at least one of a key used for communication over an air interface or a key 1 used for communication over an F1 interface;

receiving first information from the first donor node; and maintaining the first key and a second key in response to the first information, wherein the second key comprises a key used for communication over an air interface between the first node and a second donor node to which the first node hands over and a key 2 used for communication over the F1 interface.

16. The non-transitory computer readable medium according to claim 15, wherein the key used for communication over the air interface comprises a root key.

17. The non-transitory computer readable medium according to claim 15, wherein the first information is carried in a message indicating the first node to hand over to the second donor node; or the first information is carried in a message used to configure the second donor node as a secondary donor node of the first node.

18. The non-transitory computer readable medium according to claim 15, wherein the first donor node is a source donor node, and the second donor node is a target donor node.

19. The non-transitory computer readable medium according to claim 15, wherein the second donor node sends, to the first donor node, an internet protocol (IP) address allocated by the second donor node to the first node.

20. The non-transitory computer readable medium according to claim 15, wherein the key used for communication over an air interface between the first node and a second donor node to which the first node hands over is generated by using a physical cell identifier (PCI) of a first target cell under the second donor node.

* * * * *